US009018815B2

(12) United States Patent
Nakamura et al.

(10) Patent No.: US 9,018,815 B2
(45) Date of Patent: Apr. 28, 2015

(54) GENERATOR

(75) Inventors: Kenji Nakamura, Miyagi (JP); Osamu Ichinokura, Miyagi (JP)

(73) Assignee: Tohoku University, Sendai-shi, Miyagi (JP)

( * ) Notice: Subject to any disclaimer, the term of this patent is extended or adjusted under 35 U.S.C. 154(b) by 711 days.

(21) Appl. No.: 13/201,411

(22) PCT Filed: Nov. 30, 2009

(86) PCT No.: PCT/JP2009/070135
§ 371 (c)(1),
(2), (4) Date: Oct. 21, 2011

(87) PCT Pub. No.: WO2010/092724
PCT Pub. Date: Aug. 19, 2010

(65) Prior Publication Data
US 2012/0025652 A1 Feb. 2, 2012

(30) Foreign Application Priority Data
Feb. 14, 2009 (JP) ................................. 2009-032081

(51) Int. Cl.
*H02K 21/38* (2006.01)
*H02K 1/14* (2006.01)
(Continued)

(52) U.S. Cl.
CPC ................ *H02K 21/44* (2013.01); *H02K 1/141* (2013.01); *H02K 1/17* (2013.01); *F01D 15/10* (2013.01)

(58) Field of Classification Search
CPC ........... H02K 1/17; H02K 1/141; F01D 15/10
USPC .............................. 310/216.093, 154.02, 181
See application file for complete search history.

(56) References Cited

U.S. PATENT DOCUMENTS 2,750,522 A * 6/1956 Seiden .......................... 310/152

3,560,820 A * 2/1971 Unnewehr ................. 318/400.2
(Continued)

FOREIGN PATENT DOCUMENTS

| CN | 1950991 A | 4/2007 |
| JP | 53-95104 A | 12/1976 |

(Continued)

*Primary Examiner* — Alex W Mok
(74) *Attorney, Agent, or Firm* — Westerman, Hattori, Daniels & Adrian, LLP

(57) ABSTRACT

The generator comprises a stator (10) having a plurality of protruding portions for stator pole (12) on the outer peripheral surface of the stator main unit (11), and a rotor (20) having a plurality of protruding portions for rotor (22) mounted around the stator (10) in a rotatable state. Since the height of the plurality of protruding portions for stator pole (12) decreases along the rotational or reverse rotational direction of the rotor (20), a torque waveform containing odd-order components is generated when the rotor (20) is rotated coaxially around the stator (10). The plurality of protruding portions for stator pole (12) comprises a first protrusion group for stator pole (12A) and a second protrusion group for stator pole (12B), and the first protrusion group for stator pole (12A) and the second protrusion group for stator pole (12B) are formed with the protruding portions for stator pole (12) laid out along the circumferential direction spaced apart from each other. The rotor (10) has a first ring member (21A) and a second ring member (21B) separated from each other in the axial direction at a given distance, a first protrusion group for rotor pole (22A) having half of the plurality of protruding portions for rotor poles (22) aligned along the inner peripheral surface of the first ring member (21A) spaced apart from each other, and a second protrusion group for rotor pole (22B) having half of the plurality of protruding portions for rotor poles (22) aligned along the inner peripheral surface of the second ring member (21B) spaced apart from each other. By placing the first protrusion group for stator pole (12A) and the second protrusion group for stator pole (12B) in the same phase, and shifting the second protrusion group for rotor (22B) from the first protrusion group for rotor (22A) by a mechanical angle allowing their electrical phases to deviate by 180°, odd-order components of the torque waveform can be canceled, and torque ripple can be reduced.

14 Claims, 19 Drawing Sheets

(51) Int. Cl.
*H02K 21/44* (2006.01)
*H02K 1/17* (2006.01)
*F01D 15/10* (2006.01)

(56) References Cited

U.S. PATENT DOCUMENTS

| | | | | |
|---|---|---|---|---|
| 4,626,752 A * | 12/1986 | Fujisaki et al. | ......... | 318/400.38 |
| 4,785,213 A * | 11/1988 | Satake | ......... | 310/116 |
| 5,138,213 A * | 8/1992 | Sottek | ......... | 310/269 |
| 5,545,943 A * | 8/1996 | Satake et al. | ......... | 310/350 |
| 5,760,520 A * | 6/1998 | Hasebe et al. | ......... | 310/156.19 |
| 5,990,590 A * | 11/1999 | Roesel et al. | ......... | 310/113 |
| 6,072,260 A | 6/2000 | Randall | | |
| 6,172,440 B1 * | 1/2001 | Sasaki et al. | ......... | 310/156.38 |
| 6,411,003 B1 * | 6/2002 | Sasaki et al. | ......... | 310/156.02 |
| 6,563,246 B1 * | 5/2003 | Kajiura et al. | ......... | 310/162 |
| 6,831,385 B2 * | 12/2004 | Hasegawa et al. | ......... | 310/90.5 |
| 6,885,121 B2 * | 4/2005 | Okada et al. | ......... | 310/90.5 |
| 7,683,514 B2 * | 3/2010 | Onuma et al. | ......... | 310/90.5 |
| 2002/0117924 A1 * | 8/2002 | Dilliner | ......... | 310/181 |
| 2003/0015931 A1 * | 1/2003 | Nishimura | ......... | 310/184 |
| 2003/0090167 A1 * | 5/2003 | Kajiura et al. | ......... | 310/156.36 |
| 2005/0231046 A1 * | 10/2005 | Aoshima | ......... | 310/49 R |
| 2006/0267415 A1 * | 11/2006 | Qiu | ......... | 310/12 |
| 2007/0145834 A1 * | 6/2007 | Usui | ......... | 310/49 R |
| 2007/0252468 A1 * | 11/2007 | Lee | ......... | 310/156.53 |
| 2008/0030092 A1 * | 2/2008 | Rolando Avila Cusicanqui | ......... | 310/154.02 |
| 2008/0272664 A1 * | 11/2008 | Flynn | ......... | 310/154.01 |
| 2009/0021089 A1 * | 1/2009 | Nashiki | ......... | 310/46 |
| 2009/0072649 A1 * | 3/2009 | Rottmerhusen | ......... | 310/156.32 |
| 2009/0160391 A1 * | 6/2009 | Flynn | ......... | 318/701 |
| 2010/0071971 A1 * | 3/2010 | Tatematsu et al. | ......... | 180/65.8 |
| 2011/0084567 A1 * | 4/2011 | Ichiyama | ......... | 310/181 |

FOREIGN PATENT DOCUMENTS

| | | | | |
|---|---|---|---|---|
| JP | 56159955 A | * | 12/1981 | ......... H02K 16/00 |
| JP | 05-344697 A | | 12/1993 | |
| JP | 06-311711 A | | 11/1994 | |
| JP | 2850644 B2 | | 1/1999 | |
| JP | 11-262225 A | | 9/1999 | |
| JP | 2000-152577 A | | 5/2000 | |
| JP | 2002-262533 A | | 9/2002 | |
| JP | 2006-149030 A | | 6/2006 | |
| JP | 2007-312444 A | | 11/2007 | |

* cited by examiner

Fig. 15
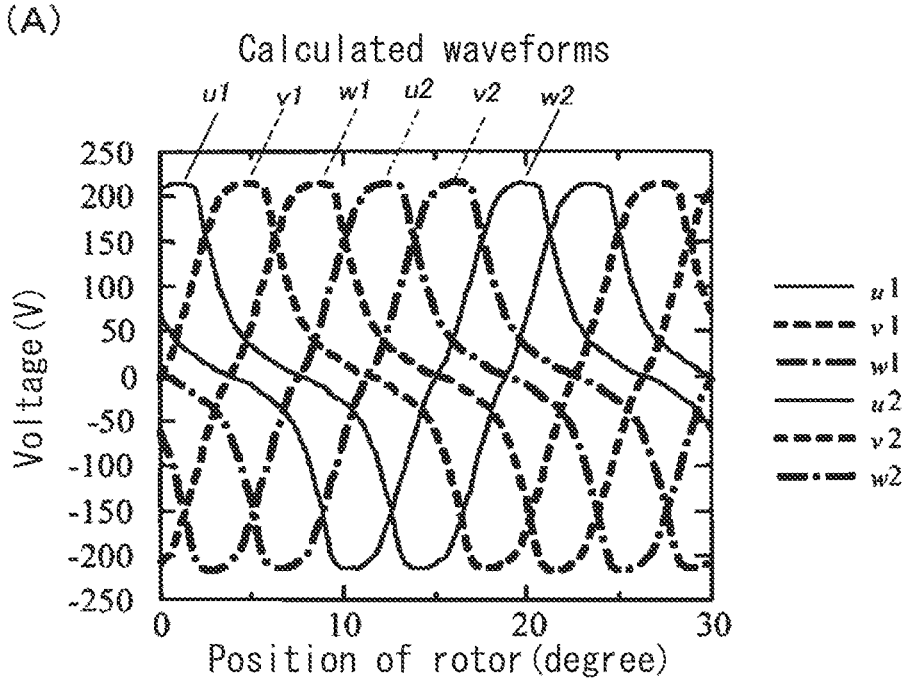
(A) Calculated waveforms
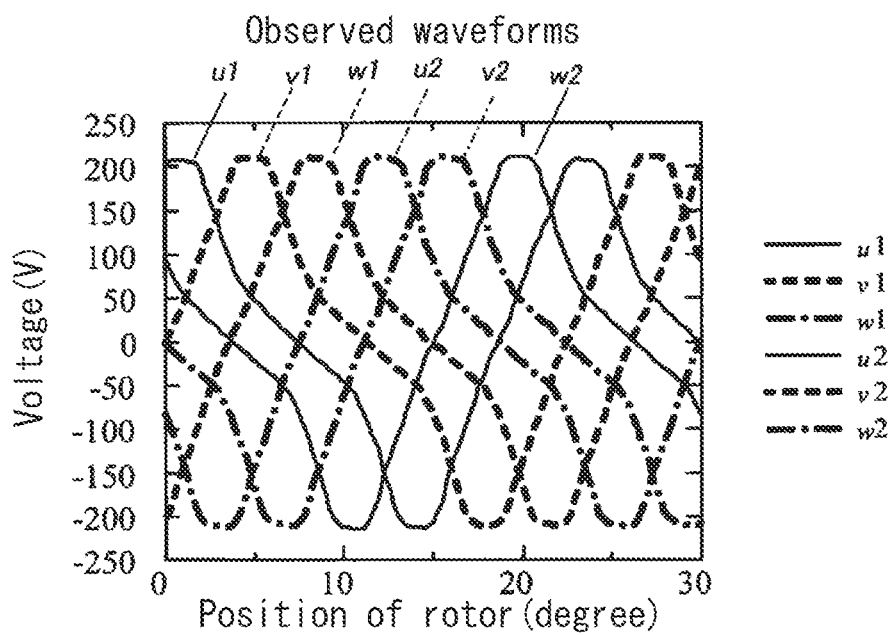
(B) Observed waveforms

GENERATOR

TECHNICAL FIELD

The present invention relates to a variable-reluctance generator utilizing the change in reluctance of a magnetic circuit.

BACKGROUND ART

As measures against global warming and for energy saving, expectations for distributed power generation, including wind power generation, small hydroelectric power generation, and micro gas turbine power generation, are growing, and to ensure distributed power generation, the demand for small-to-medium-capacity generators is expanding. With generators for wind power generation and small hydroelectric power generation, in particular, since systems need to be downsized, expensive rare-earth magnets are generally used.

Meanwhile, to ensure power generation from low speed and minimize cogging torque and torque ripple, generators having no core, coreless-type generators as they are called, are regarded as promising. Generally, cogging torque is defined as torque pulsation that occurs in a state where winding is opened, namely where winding current is not fed. When a rotor is rotated, magnets and core are attracted to each other, thus causing cogging torque. Meanwhile, torque ripple is defined as torque pulsation that occurs in a state where a load is connected to the winding, namely where winding current is fed. When the rotor is rotated, interaction between magnets, core, and the magnetic force due to winding current generates torque ripple.

Patent Literature 3 discloses a reluctance motor comprising a stator having wire-wound salient poles and a rotor having salient poles, wherein the sharp edge at one of the end faces of the salient pole of the stator and that of the rotor are chamfered to prevent high harmonic component from being contained in the inductance of the winding.

Patent Literature 4 discloses a generator a stator and a rotor, wherein cutouts are provided asymmetrically at the tip of the salient poles of the rotor, and wherein torque ripple generated at the time of regenerating operation is reduced by the effect of these cutouts.

CITATION LIST

Patent Literature

Patent Literature 1: JP1994-311711A
Patent literature 2: JP2002-262533A
Patent Literature 3: JP2000-152577A (Claim 2, Specification paragraphs [0020] and [0021])
Patent Literature 4: JP2006-149030A (Abstract)

SUMMARY OF THE INVENTION

Technical Problem

However, with a coreless-type generator, not only output density decreases but also cost reduction cannot be achieved because expensive materials such as rare-earth magnets are used.

Patent Literature 1 discloses a rotor structure in which two armatures, namely rotors, are in arbitrary positional relation allowing difference of up to 180° in electric angle. This structure improves lamination factor and exciting force, but nothing more.

Meanwhile, to reduce cogging torque and torque ripple, Patent Literature 2 adopts a skewed rotor pole. However, although the use of skewed rotor pole decreases torque ripple, generator output also decreases, which is a problem.

With the reluctance motor disclosed in Patent Literature 3, if inductance distribution is made to be sinusoidal and sinusoidal current is used for excitation, torque ripple can be reduced. This reluctance motor, however, is classified into a type called switched reluctance motor. To operate this type of motor at high output and efficiency, excitation is generally performed not by sinusoidal voltage but by rectangular-wave voltage. Consequently, the reluctance motor disclosed in Patent Literature 3 can reduce torque ripple to some extent, but desired output or efficiency cannot be obtained.

The invention disclosed in Patent Literature 4 can decrease torque ripple to some extent, but cannot eliminate it in principle.

In view of the above, the present invention intends to provide a generator achieving low torque ripple without decreasing power generation efficiency.

Solution to Problem

Having developed a three-phase variable reluctance generator with permanent magnets embedded in a stator, the inventor et al. have succeeded in reducing torque ripple by 50% or more, with respect to conventional generators, by adopting a multiple stator structure, placing a rotor on the outside and a stator on the inside, mounting magnets to the stator to achieve a core structure, and elaborating the shape of the tip of the rotor pole of the rotor, thus having completed the present invention. In addition, decrease in the output did not occur even if low-cost ferrite magnets were used as permanent magnets to be embedded in the stator.

To achieve the above objective, the first aspect of the generator according to the present invention comprises: a stator having a plurality of protruding portions for stator pole placed next to each other on the outer peripheral surface of a stator main unit; and a rotor having a plurality of protruding portions for rotor pole placed around the stator in a rotatable state, wherein the height of the protruding portions of either the plurality of protruding portions for stator pole or the plurality of protruding portions for rotor pole decreases along the rotational direction or reverse rotational direction of the rotor; the plurality of protruding portions for stator pole are separated into a first protrusion group for stator pole and a second protrusion group for stator pole spaced apart from each other at a given distance in the axial direction; the first protrusion group for stator pole and the second protrusion group for stator pole are both structured with the protruding portions for stator pole aligned in a circumferential direction spaced apart from each other; the rotor has a first ring member and a second ring member separated from each other at a given distance in the axial direction, a first protrusion group for rotor pole having half of the plurality of protruding portions for rotor pole aligned along the inner peripheral surface of the first ring member, and a second protrusion group for rotor pole having half of the plurality of protruding portions for rotor pole aligned along the inner peripheral surface of the second ring member; the first protrusion group for stator pole and the second protrusion group for stator pole are placed in the same phase; and the second protrusion group for rotor pole is shifted from the first protrusion group for rotor pole by a mechanical angle around the axis allowing their electrical phases to be deviated by 180°.

The second aspect of the generator according to the present invention comprises: a stator having a plurality of protruding portions for stator pole placed next to each other on the outer peripheral surface of a stator main unit; and a rotor having a plurality of protruding portions for rotor pole placed around the stator in a rotatable state, wherein the height of the protruding portions of either the plurality of protruding portions for stator pole or the plurality of protruding portions for rotor pole decreases along the rotational direction or reverse rotational direction of the rotor; the plurality of protruding portions for stator pole are separated into a first protrusion group for stator pole and a second protrusion group for stator pole spaced apart from each other at a given distance in the axial direction; the first protrusion group for stator pole and the second protrusion group for stator pole are both structured with the protruding portions for stator pole aligned in a circumferential direction spaced apart from each other; the rotor has a first ring member and a second ring member separated from each other at a given distance in the axial direction, a first protrusion group for rotor pole having half of the plurality of protruding portions for rotor pole aligned along the inner peripheral surface of the first ring member, and a second protrusion group for rotor pole having half of the plurality of protruding portions for rotor pole aligned along the inner peripheral surface of the second ring member; the first protrusion group for rotor pole and the second protrusion group for rotor pole are placed in the same phase; and the second protrusion group for stator pole is shifted from the first protrusion group for stator pole by a mechanical angle around the axis allowing their electrical phases to be deviated by 180°.

In the first and the second aspects described above, the plurality of protruding portions for rotor pole preferably have a first tapered surface with the height of the protruding portions decreasing along the rotational direction of the rotor and a second tapered surface with the height of the protruding portions decreasing along the reverse rotational direction of the rotor. In particular, each tip of the plurality of protruding portions for rotor pole has a projecting surface whose cross section is in an arc-like shape between the first tapered surface and the second tapered surface.

In either the first or the second aspect described above, the plurality of protruding portions for stator pole preferably have a first tapered surface with the height of the protruding portion decreasing along the rotational direction of the rotor and a second tapered surface with the height of the protruding portion decreasing along the reverse rotational direction of the rotor. In particular, each tip of the plurality of protruding portions for stator pole has a projecting surface whose cross section is in an arc-like shape between the first tapered surface and the second tapered surface.

In either the first or the second aspect described above, magnets are preferably provided to the rotor at positions facing opposite to each other across the shaft, forming pairs. More preferably, the magnets are placed in a shape of a cross centered on the shaft of the stator, and ferrite magnets can be used as the relevant magnets.

Advantageous Effects of the Invention

According to the first aspect of the present invention, by decreasing the height of the protruding portion of each of the plurality of protruding portions for stator or that of each of the plurality of protruding portions for rotor along the rotating or reverse rotating direction of the rotor, namely by forming the tip of either the rotor pole or the stator pole in a tapered shape, torque waveform having an odd-order component is generated when the rotor is rotated coaxially around the stator. In addition, since the first protrusion group for stator pole and the second protrusion group for stator pole are placed in the same phase, and each protruding portion of the first protrusion group for stator pole and each protruding portion of the second protrusion group for stator pole are placed so that electrical phase difference between them remains at 180°, namely half cycle, odd-order component of the above torque waveform is canceled, allowing DC component only to remain and torque ripple to be decreased.

According to the second aspect of the present invention, by decreasing the height of the protruding portion of each of the plurality of protruding portions for stator or that of each of the plurality of protruding portions for rotor along the rotating or reverse rotating direction of the rotor, namely by forming the tip of either the rotor pole or the stator pole in a tapered shape, torque waveform having an odd-order component is generated when the rotor is rotated coaxially around the stator. In addition, since the first protrusion group for rotor pole and the second protrusion group for rotor pole are placed in the same phase, and each protruding portion of the first protrusion group for stator pole and each protruding portion of the second protrusion group for stator pole are placed so that electrical phase difference between them remains at 180°, namely half cycle, odd-order component of the above torque waveform is canceled, allowing DC component only to remain and torque ripple to be decreased.

Furthermore, since the stator is placed inside, the rotor is placed outside, and magnets and windings are attached to the stator, downsizing is facilitated, and the core structure adopted does not invite decrease in output. In addition, by using ferrite magnets, which are inexpensive compared to rare-earth magnets, cost reduction can be achieved.

BRIEF DESCRIPTION OF DRAWINGS

FIG. 15 is a chart showing the waveforms of voltage induced to the winding in the example in a state where the winding is opened, namely under no load, in which (A) shows calculated waveforms and (B) shows observed waveforms.

REFERENCE SIGN LIST

Figure 1:
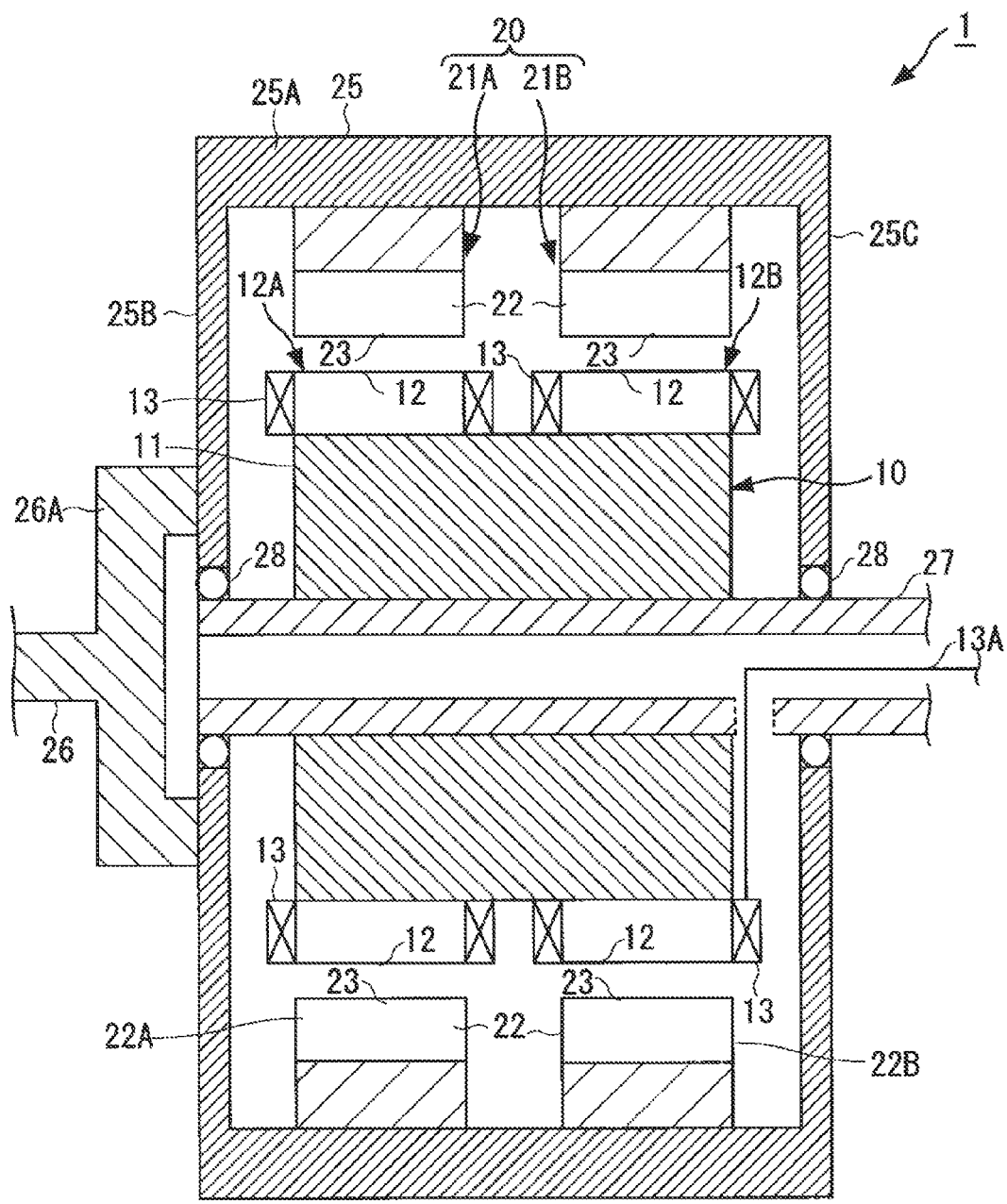
FIG. 1 is a cross-sectional view of a generator related to the first embodiment of the present invention.

1: Generator
10, 60: Stator
11. 61: Stator main unit
12, 62: Protruding portion (Protruding portion for stator pole)
12A, 62A: First protrusion group (First protrusion group for stator pole)
12B: Second protrusion group (Second protrusion group for stator pole)
13, 66: Winding
14A, 14B, 14C, 14D, 64A, 64B, 64C, 64D: Magnet
15: Hollow
20, 70: Rotor
21A, 71A: First ring member
21B: Second ring member
22, 72: Protruding portion (Protruding portion for rotor pole)
22A, 72A: First protrusion group (First protrusion group for rotor pole)
22B, 72B: Second protrusion group (Second protrusion group for rotor pole)
23, 63: Tip of the protruding portion
23A: Center of the protruding portion
24, 65: Opposing surface
24A, 65A: First tapered surface
24B, 65B: Second tapered surface
24C, 65C: Curved surface
24D, 24E: Tapered surface
24F: Projecting surface
25: Outer frame
25A: Cylindrical portion
25B, 25C: Side portion
26: Power-transmitting unit
26A: End portion
27: Fixed shaft
28: Bearing
50: Demonstration experimental system
51: Motor
52: Torque meter

DESCRIPTION OF EMBODIMENTS

Some embodiments of the present invention will hereafter be described in detail by referring to the drawings.

First Embodiment

Figure 2:
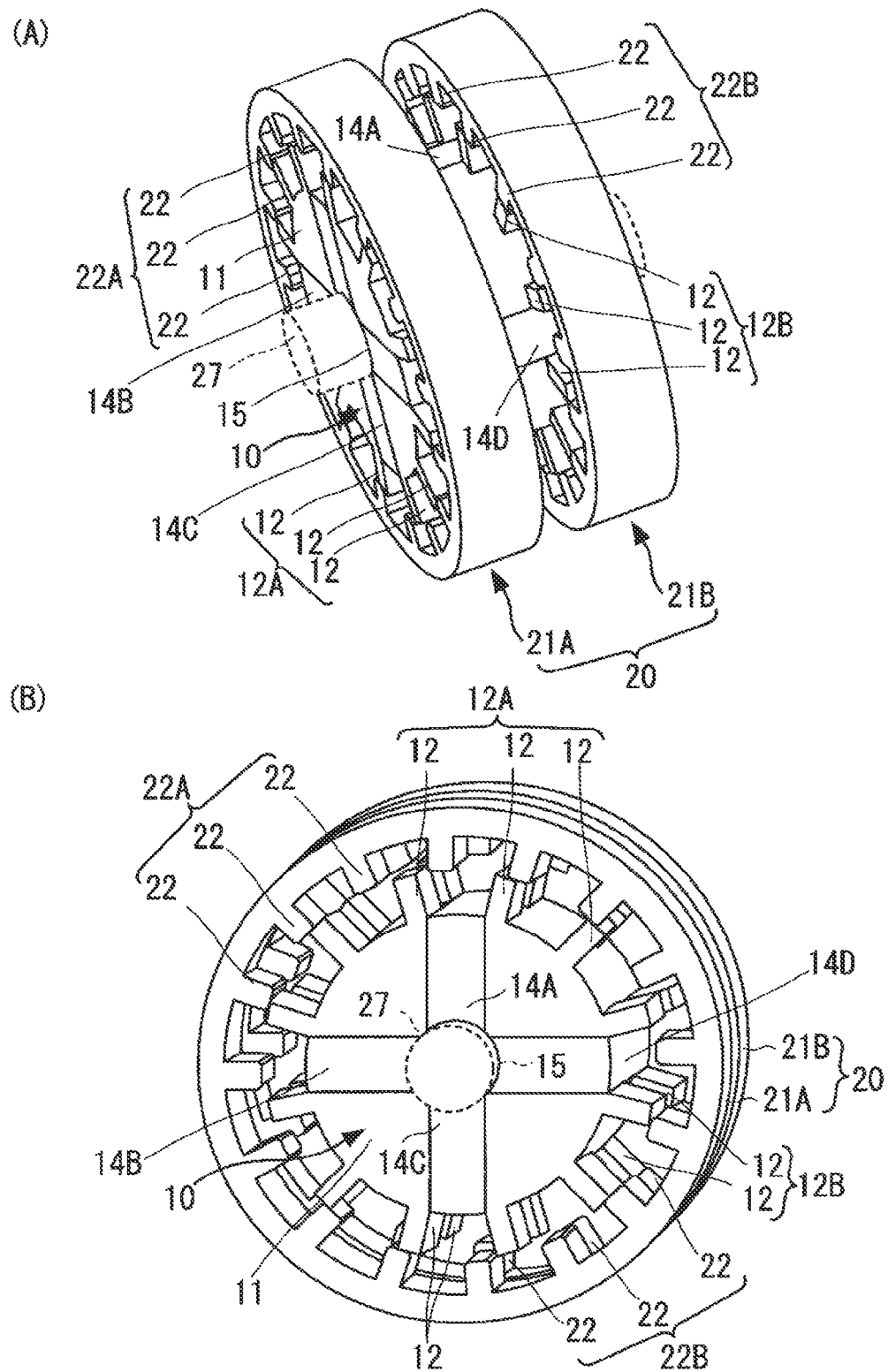
FIG. 2 illustrates the relation between a stator and a rotor of the generator shown in FIG. 1, (A) being a perspective illustration viewed from a certain direction, and (B) being a perspective illustration viewed from another direction.
Figure 3:
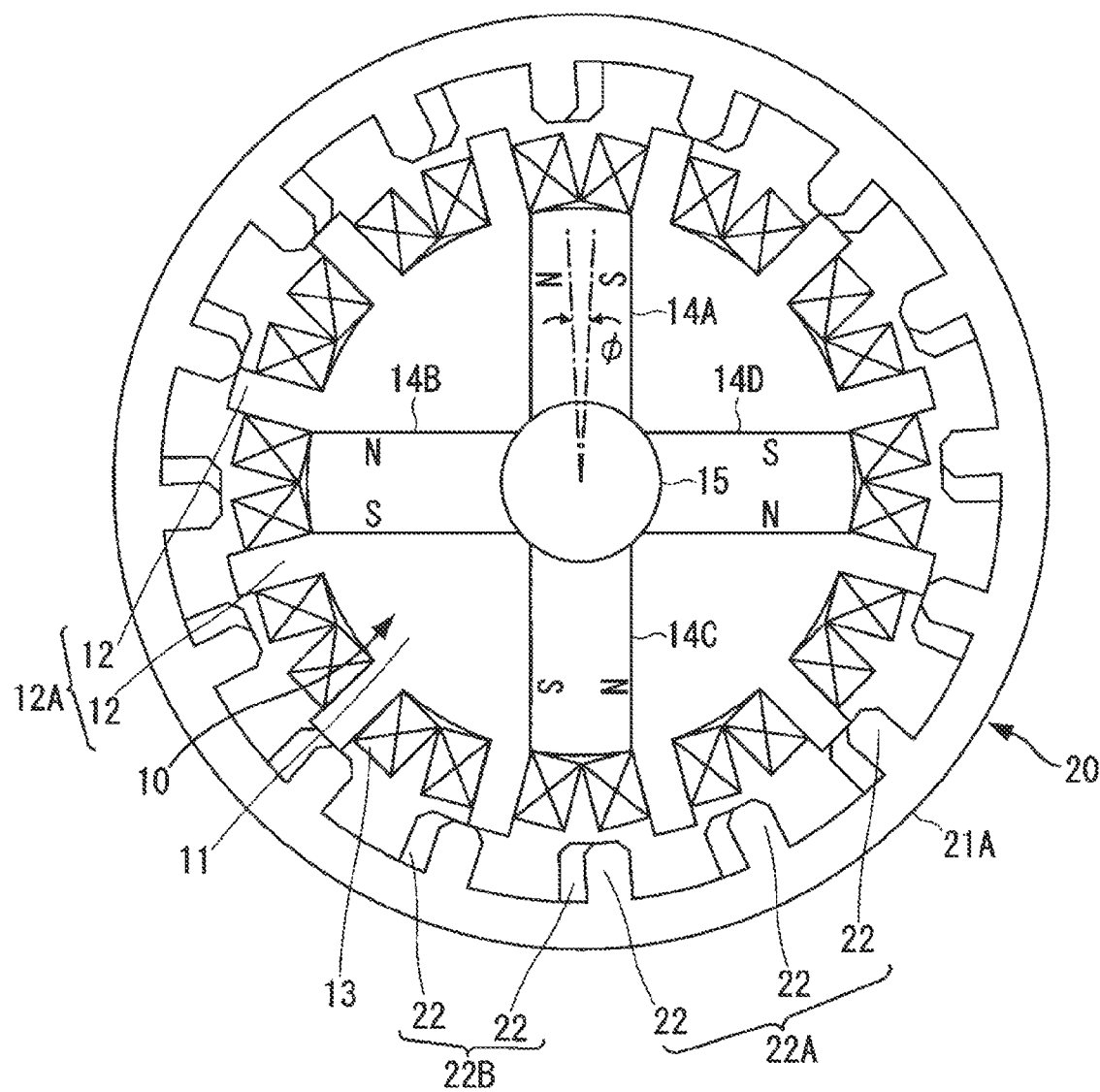
FIG. 3 is a side view of the generator shown in FIG. 1 illustrating the relation between the stator and the rotor.

FIG. 1 is a cross-sectional view of a generator 1 related to the first embodiment of the present invention, and FIG. 2 illustrates the relation between a stator 10 and a rotor 20 of the generator 1 shown in FIG. 1, (A) being a perspective illustration viewed from a certain direction, and (B) being a perspective illustration viewed from another direction. FIG. 3 is a front view showing the relation between the stator 10 and the rotor 20 of the generator 1 shown in FIG. 1.

The generator 1 related to the first embodiment of the present invention has a stator 10 and a rotor 20, as shown in FIGS. 1 to 3. The stator 10 is in a cylindrical shape, and on its curved outer peripheral surface, protruding portions 12 are formed at certain intervals, and windings 13 are attached to each protruding portion 12. This protruding portion 12 is to be called the protruding portion for stator pole, or simply stator pole. The rotor 20 is comprised of a first ring member 21A and a second ring member 21B coaxially mounted facing opposite to the outer peripheral surface of the stator 10, and on the internal peripheral surface of the first ring member 21A and the second ring member 21B, protruding portions 22 are formed. This protruding portion 22 is to be called the protruding portion for rotor pole, or simply rotor pole 22. The structure of the stator 10 and the rotor 20 will be described in detail later.

As shown in FIG. 1, the generator 1 further comprises an outer frame 25 for housing the first and the second ring members 21A, 21B, a power-transmitting unit 26 for transmitting power to the outer frame 25, and a fixed shaft 27 in a tubular form provided on the extension of the shaft of the power-transmitting unit 26 and on the central axis of the stator 10.

The outer frame 25, power-transmitting unit 26, and fixed shaft 27 will hereafter be described in detail. The fixed shaft 27 is in a tubular form, and inserted into the hollow 15 of the stator 10. The outer frame 25 integrates a cylindrical portion 25A having a larger diameter than that of the first and the second ring members 21A, 21B, a side portion 25B, and the other side portion 25C. The side portions 25B, 25C of the outer frame 25 are provided with a pass-through opening coaxially, bearings are mounted to each pass-through opening, and thus the outer frame 25 is mounted to the fixed shaft 27 in a rotatable state with the bearings 28, 28. On the axis of one of the side portions 25B of the outer frame 25, the fixed shaft 27 is placed close to the side portion 25B from outside. The power-transmitting unit 26 is mounted coaxially on the extension of the fixed shaft 27. At the end portion 26A of the power-transmitting unit 26, a flange is formed, and the end portion 26A of the power-transmitting unit 26 and the one of the side portion 25B of the outer frame 25 are connected with mounting tools such as screws (not shown).

With this structure, if torque by wind or hydraulic power is transmitted to the power-transmitting unit 26, the torque is transmitted to the outer frame 25 and the rotor 20 is rotated, whereas the stator 10 and the fixed shaft 27 mounted on its central axis remain fixed. In this case, one side portion 25B of the outer frame 25 in the axial direction and the power-transmitting unit 26 are connected with mounting tools such as screws (not shown), since bearings 28, 28 are mounted to one side portion 25B and the other side portion 25C of the outer frame 25, the torque of the power-transmitting unit 26 can be transmitted to the rotor 20 smoothly via the outer frame 25.

The structure of the stator 10 will be described in detail below. The stator 10 is in a cylindrical form having a plurality of protruding portions 12 sticking out from the outer periphery of the stator main unit 11 as stator poles. More specifically, on the outer peripheral surface of the stator main unit 11, a first protrusion group 12A and a second protrusion group 12B are provided spaced apart from each other at a given distance in the axial direction. Each protruding portion for stator pole 12, whose cross-sectional area is in a short rectangular shape, of the first protrusion group 12A and the second protrusion group 12B is formed so that they have a given center angle around the central axis of the cylinder. Coiled windings 13 are attached to each protruding portion 12 for stator pole, and given windings 13 are connected. The winding 13 is wired to the hollow of the fixed shaft 27 via a hole formed at the fixed shaft 27, for example. The winding 13 is not shown in FIG. 2 (A) or FIG. 2 (B). The first protrusion group 12A and the second protrusion group 12B are to be called a first protrusion group for stator pole and a second protrusion group for stator pole respectively.

The rotor 20 will hereafter be described in detail. The rotor 20 is placed concentrically with the stator 10 on the outside of the cylindrical outer periphery of the stator 10. The rotor 20 is configured, with a first ring member 21A and a second ring member 21B spaced apart from each other in the axial direction, fixed to the inner side of the cylindrical portion 25A of the outer frame 25, for example. In this case, the first ring member 21A is placed with its inner surface facing opposite to the first protrusion group for stator pole 12A of the stator 10. The second ring member 21B is placed with its inner surface facing opposite to the second protrusion group for stator pole 12B of the stator 10. On the internal peripheral surface of the first ring member 21A, a plurality of protruding portions 22 for rotor pole are provided, constituting the first protrusion group 22A. Similarly, On the internal peripheral surface of the second ring member 21B, a plurality of protruding portions 22 for rotor pole are provided, constituting the second protrusion group 22B. The protruding portions 22 for rotor pole provided on the inner peripheral surface of the first and the second ring members 21A, 21B operate as rotor poles. The first protrusion group 22A and the second protrusion group 22B are to be called the first protrusion group for rotor pole 22A and the second protrusion group for rotor pole 22B respectively.

Since the stator 10 and the rotor 20 are configured as described above, if the rotor 22 is rotated due to the force applied from outside, a state, in which each protruding portion 22 for rotor pole 22 of the first protrusion group for rotor pole 22A faces, or does not face, opposite to each protruding portion 12 for stator pole of the first protrusion group for stator pole 12A, is generated. Similarly, a state, in which each protruding portion 22 for rotor pole in the second protrusion group for rotor pole 22B faces, or does not face, opposite to each protruding portion 12 for stator pole of the second protrusion group for stator pole 12B, is generated. Consequently, in a magnetic circuit formed with the stator 10 and the rotor 20, magnetic reluctance changes, thus generating induced electromotive force at the windings 13 attached to each protruding portion 12 for stator pole of the stator 10.

The relation between the first protrusion group for rotor pole 22A and the second protrusion group for rotor pole 22B of the rotor 22 is as follows: The first protrusion group for rotor pole 22A is deviated from the second protrusion group for rotor pole 22B by a given angle around the rotational central axis. Specifically, the second protrusion group for rotor pole 22B of the rotor 20 is shifted from the first protrusion group for rotor pole 22A by mechanical angle φ around the rotational central axis allowing the electrical phases to differ by 180°, namely half cycle. In a state shown in FIGS. 2 (A), (B) and FIG. 3, to the first protrusion group for stator pole 12A and the second protrusion group 12B for stator pole 10, the same number of protruding portions 12 for stator pole is provided as stator poles. The number x of each stator pole in the first protrusion group 12A and that of the second protrusion group 12B are both 12. Meanwhile, to the first protrusion group for rotor pole 22A and the second protrusion group for rotor pole 22B, the same number of protruding portions 22 for rotor pole is provided as rotor poles. The number y of rotor poles in the first protrusion group 22A and that of the second protrusion group 22B are both 16. Consequently, the mechanical angle φ shown in FIG. 3 is assumed to be 3.75°. Generally, mechanical angle φ is given by the following equation:

$$\text{Mechanical angle } \phi = 180° \times |1/x - 1/y|$$

Consequently, the induced electromotive force generated to the windings 13 attached to each protruding portion 12 for the first protrusion group for stator pole 12A and the induced electromotive force generated to the windings 13 attached to each protruding portion 12 for the second protrusion group stator pole 12B are made to differ in electrical phase by 180°. Note, however, that as shown in the figure, the first protrusion group 12A and the second protrusion group 12B for stator pole must be laid out so that they are in the same phase.

Major features of the first embodiment of the present invention will be described below:

First, with the first embodiment of the present invention, the first protrusion group for stator pole 12A and the second protrusion group 12B for stator pole of the stator 10 have the same shape, and a plurality of protruding portions 12 for stator pole of these first and the second protrusion groups 12A, 12B for stator pole are formed so that they have a given center angle respectively around the central axis of the cylinder. Meanwhile, the first ring member 21A and the second ring member 21B, which are in the same shape, of the rotor 20 are placed in the axial direction spaced apart from each other. Each protruding portion 22 for rotor pole of the first protrusion group for rotor pole 22A of the rotor 20 and each protruding portion 22 for rotor pole of the second protrusion group for rotor pole 22B of the rotor 20 are arranged so that the electrical phase difference is maintained at 180°, namely half cycle. In other words, the first protrusion group for stator pole 12A of the stator 10 and the first protrusion group for rotor pole 22A of the rotor 20 constitute PMRG in a first stage, the second protrusion group for stator pole 12B of the stator 10 and the second protrusion group for rotor pole 22B of the rotor 20 constitute PMRG in the second stage, and the first protrusion group for rotor pole 22A and the second protrusion group for rotor pole 22B of the rotor 20 are deviated from each other concentrically around the axis by mechanical angle φ given by the equation shown above so that the electrical phase difference between the first-stage PMRG and the second-stage PMRG is maintained at 180°. PMRG (permanent magnet reluctance generator) is defined as the pair of a plurality of stator poles provided on the outer peripheral surface of the stator 10 spaced apart from each other and a plurality of rotor poles provided on the inner peripheral surface of the rotor 20 spaced apart from each other.

This structure allows torque waveforms in the same shape having electrical phase difference by half cycle to be superimposed, thus canceling the fundamental waves and odd-order harmonic components, of torque waveforms, and decreasing torque ripples.

Figure 4:
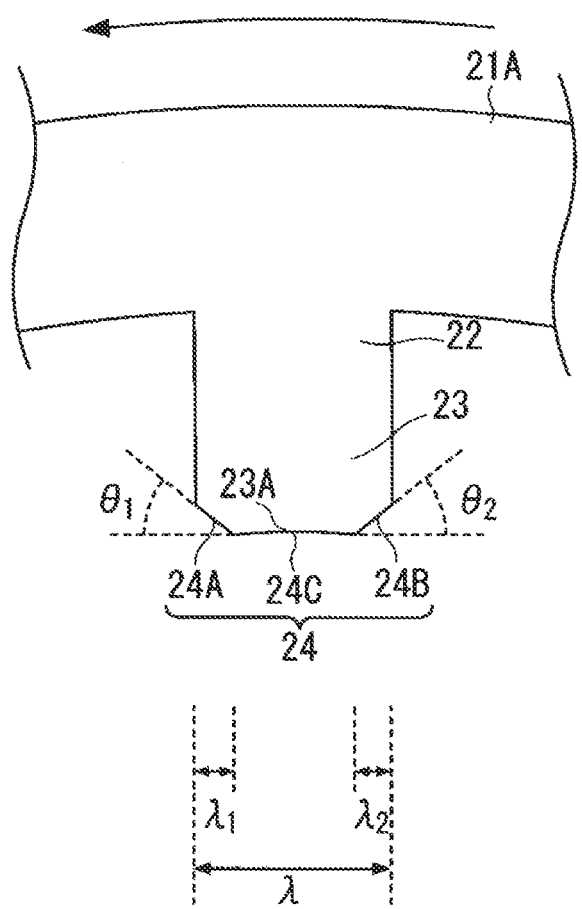
FIG. 4 is a side view of a part of the rotor shown in FIG. 1.

Secondly, with the first embodiment of the present invention, each protruding portion 22 for rotor pole of the rotor 20 has a shape as described below. FIG. 4 is a side view of a part of the rotor 20. FIG. 4 illustrates a part of the first ring member 21A of the rotor 20 and one of the protruding portions 22 for rotor pole protruding from the inner peripheral surface of the first ring member 21A toward the axis of rotation shown in FIG. 3. Since the second ring member 21B has the same structure, illustration is omitted.

As shown in FIGS. 3 and 4, the tip 23 of each protruding portion 22 for rotor pole protruding from the inner peripheral surface of the first and the second ring members 21A, 21B of the rotor 20 is tapered so that the height of the protruding portion expressed by the position of the surface facing opposite to the stator 10 decreases along the rotational and reverse rotational directions. In addition, the central part 23A of the surface 24 facing opposite to the stator 10 is formed so that its cross-sectional area is in the form of a segment of a circle. Specifically, the tip 23 of each protruding portion 22 for rotor pole of the rotor 20 has a flat first tapered surface 24A whose cross section is in a linear form, with the height of the protruding portion decreasing along the rotational direction shown by the arrow, a flat second tapered surface 24B whose cross section is in a linear form, with the height of the protruding portion decreasing along the direction reverse to the one shown by the arrow, and a curved surface 24C provided between the first tapered surface 24A and the second tapered surface 24B. In this case, the curved surface 24C has a given radius of curvature from the central axis of rotation of the rotor 20. Such a shape of each protruding portion 22 for rotor pole allows torque ripple to be reduced. The reason for this will be described later.

Thirdly, with the first embodiment of the present invention, the stator 10 is provided inside, whereas the rotor 20 is provided around the stator 10. Since permanent magnets and winding 13 constituting a magnetic circuit is provided on the side of the stator 10, sufficient space for installing the magnets can be ensured even in the case of a multi-pole-structure PMRG. For example, as shown in FIG. 3, the stator main unit 11 integrates magnets 14A, 14B, 14C, and 14D in a structure whose cross section is in the form of a cross with respect to the hollow 15 penetrating the fixed shaft 27. "S" and "N" in FIG. 3 indicate the polarities of the magnets 14A, 14B, 14C, and 14D. The layout of the magnets 14A, 14B, 14C, and 14D is detailed as follows: The first magnet 14A, second magnet 14B, third magnet 14C, and forth magnet 14D are placed so that the central angle around the central axis of the hollow 15 forms 90°. The first magnet 14A is placed, extending upward from the hollow 15, the second magnet is placed in a position where the first magnet 14A is rotated counterclockwise by 90°, namely extending horizontally from the hollow 15, the third magnet 14C is placed, extending downward from the hollow 15, and the fourth magnet 14D is placed facing opposite to the second magnet 14B across the hollow 15. Each magnet 14A, 14B, 14C, and 14D is placed so that the surfaces forming an angle of 90° on a plane parallel in the axial direction have the same polarity. In the example shown in FIG. 3, the surface of the first magnet 14A on the side of the second magnet 14B is made to be N, the surface of the second magnet 14B on the side of the first magnet 14A is made to be N, the surface of the second magnet 14B on the side of the third magnet 14C is made to be S, the surface of the third magnet 14C on the side of the second magnet 14B is made to be S, the surface of the third magnet 14C on the side of the fourth magnet 14D is made to be N, the surface of the fourth magnet 14D on the side of the third magnet 14C is made to be N, and the surface of the fourth magnet 14D on the side of the first magnet 14A is made to be S. The polarities of each magnet 14A, 14B, 14C, and 14D may be reversed. In the example shown in FIG. 3, the four magnets 14A, 14B, 14C, and 14D are mounted around the central axis of the stator 10 at equal intervals. However, a plurality of magnets may be mounted around the central axis at equal intervals.

As magnet materials for magnets 14A to 14D, neodymium-series or ferrite-series materials can be used. Even when ferrite magnets are used for magnets 14A to 14D, power output and efficiency similar to those of neodymium magnets can be ensured, which reduces the cost of the generator 1. This point will be discussed later. The portions of the stator 10 where magnets are not provided and the rotor 20 are made of nondirectional silicon steel plate (also called nondirectional magnetic steel plate). Other members such as the outer frame 25, power-transmitting unit 26, and fixed shaft 27 may be made of a non-magnetic material. For example, the outer frame 25 can be made of aluminum, stainless steel, etc.

<Why Torque Ripple can be Reduced>

With the embodiment of the present invention, since each protruding portion 22 for rotor pole of the rotor 20 has an opposing face 24 described above, torque ripple can be reduced. This point will be discussed in detail along with the details of the development.

To reduce torque ripple, a multi-stage PMRG structure is more efficient than a single-stage PMRG, which combines a stator having stator poles spaced apart circumferentially and a rotor having rotor poles spaced apart circumferentially. However, if multi-stage PMRG structure is adopted, the size of the generator increases, and the structure becomes complicated. It is therefore preferable that two-stage stator 10 and rotor 20 structure, namely two-stage PMRG structure, be adopted. Specifically, as described previously, the stator 10 has the first protrusion group for stator pole 12A and the second protrusion group 12B for stator pole in the same shape, and each protrusion group 12A, 12B for stator pole is configured with a plurality of protruding portions 12 for stator pole laid out in an arc-like shape so that a given central angle is formed around the central axis of the cylinder. With the rotor 20, the first ring member 21A and the second ring member 21B in the same shape are placed in the axial direction spaced apart from each other. Each protruding portion 22 for rotor pole of the first protrusion group for rotor pole 22A of the rotor 20 and each protrusion 22 for rotor pole of the second protrusion group for rotor pole 22B of the rotor 20 are placed so that the electrical phase difference between them is maintained at 180°. By stacking two PMRGs, namely the combination of the stator 10 and the rotor 20, torque waveforms in the same shape with electrical phases deviating by half cycle can be superimposed, which allows the fundamental waves and odd-order harmonic components of the torque waveforms to be canceled, and torque ripple to be reduced.

However, even-order harmonic components contained in the torque waveform of a single-stage stator 10 and rotor 20 protrusion group structure remains even if a two-stage stator 10 and the rotor 20 protrusion group structure is adopted.

The inventor et al. have succeeded in reducing torque ripple by improving the shape of the rotor pole, namely the protruding portions 22 of the rotor 20, and by adopting a two-stage PMRG structure. As theoretical approach, electromagnetic field analysis was conducted using the finite element method (FEW, one of highly-reliable analysis methods in this field. The results obtained are shown in FIGS. 5 to 8.

Figure 5:
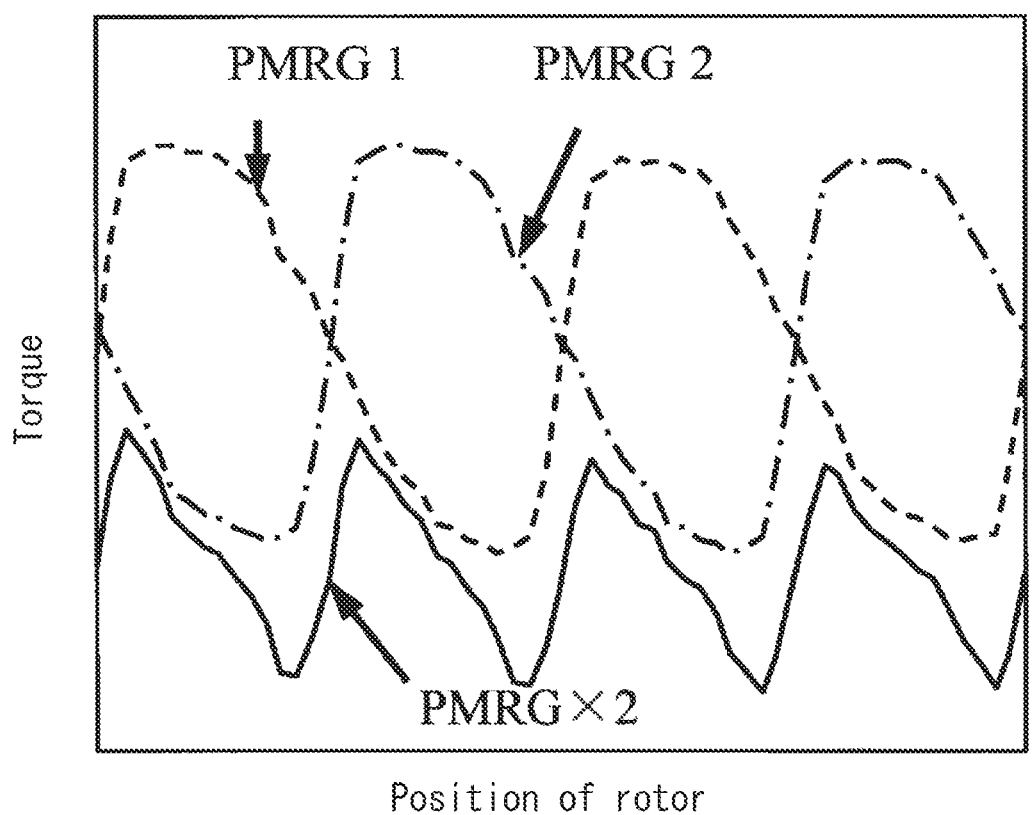
FIG. 5 is a chart showing torque waveforms of two stacked PMRGs.

FIG. 5 illustrates torque waveforms obtained when two PMRGs are stacked. The horizontal axis and the vertical axis in FIG. 5 represent the position of the rotor and torque respectively. As shown in FIG. 5, the electrical phase of the torque waveform PMRG1 (dotted line) of the first-stage PMRG deviates from the torque waveform PMRG2 (dashed dotted line) of the second-stage PMRG by 180°. However, the apex of the waveform of the first-stage PMRG and that of the second-stage PMRG deviate from the center to right and left respectively. The waveform displayed by the solid line is the composite waveform of torque waveform PMRG1 and torque waveform PMRG2. The following attempt was made: By allowing the tip of the rotor pole to have gradient, the change in magnetic reluctance of immediately before non-opposing positions was made to become sharper, and the gradient from a positive peak to negative peak of the torque waveform was made to be greater, to make each torque waveform be symmetrical with respect to the peak.

Figure 6:
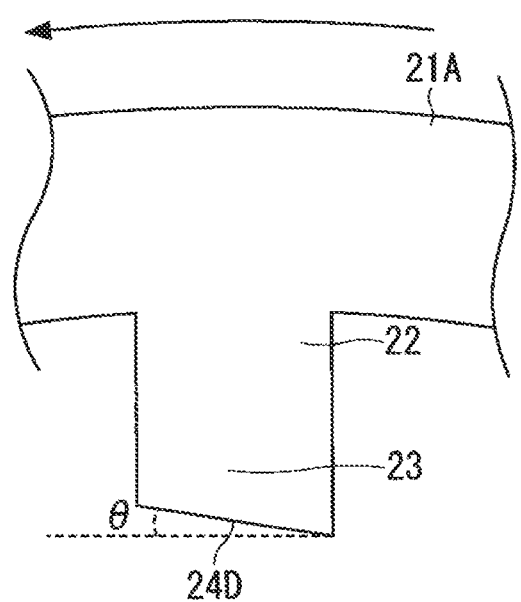
FIG. 6 is a side view of a typical protruding portion of the rotor.
Figure 7:
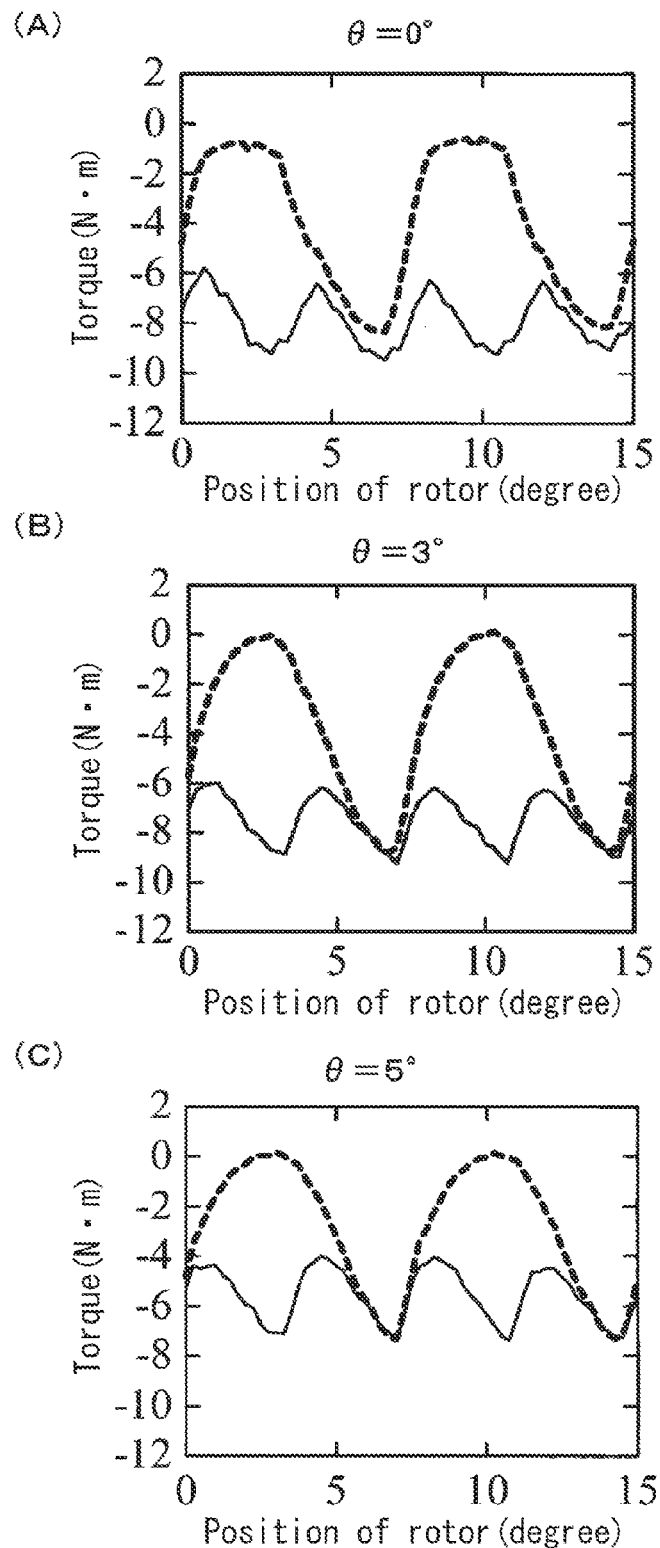
FIG. 7 is a chart illustrating the relation between cutoff angle θ and torque waveform, the cut-off angle in (A) being 0°, that in (B) being 3°, and that in (C) being 5°.

FIG. 6 is a side view illustrating an example of each protruding portion 22 for rotor pole of the rotor 20. As shown in FIG. 6, each protruding portion 22 for rotor pole provided to the first ring member 21A and the second ring member 21B has a tapered surface 24D at the tip 23, the height of the protruding portion being reduced along the rotational direction. The tapered surface 24D is formed by cutting from the side face in the reverse-rotational direction to the side in the rotational direction at the cut-off angle of θ. FIG. 7 is a chart illustrating the relation between the cut-off angle θ and torque waveforms, in which (A) is the case where the angle θ is 0°, (B) is the case where the angle θ is 3°, and (C) is the case where the angle θ is 5°. The horizontal axis represents the position of the rotor 20 by angle, and the vertical axis represents torque. The dotted line of each chart is the torque waveform obtained from one-stage PMRG, and the solid line is the torque waveform obtained from two-stage PMRG structure. As shown in FIG. 6, a tapered surface 24D is formed at the tip 23 of the protruding portion 22 for rotor pole, and no more. The rotational speed was set at 1000 rpm. The maximum output and ripple ratio were 371 W and 46.4% respectively when θ was 0°, 350 W and 43.5% when 0 was 3°, and 279 W and 60.8% when θ was 5°. As shown in FIG. 7, with the increase of cut-off angle θ, torque waveforms come close to the shape symmetrical with respect to the peak value of negative torque. When the cut-off angle θ is 0° or 3°, torque ripple is lower than the case shown in FIG. 5, and when the cut-off angle θ is 5°, the waveform is closest to perfect symmetry. However, when the cut-off angle θ is 5°, since high-order harmonic components increase as apparent around the peak value, ripple becomes larger than the case where the cut-off angle θ is 0°, probably because magnetic flux concentrates on the part having acute angle at the tip of the rotor due to increased cut-off angle θ. With the increase in the cut-off angle θ, output power also decreases.

From the above, when each protruding portion 22 for rotor pole has the shape shown in FIG. 6, ripple can be reduced to a certain degree. To reduce ripple further, a shape for preventing excessive concentration of magnetic flux as shown in FIG. 8 was devised.

Figure 8:
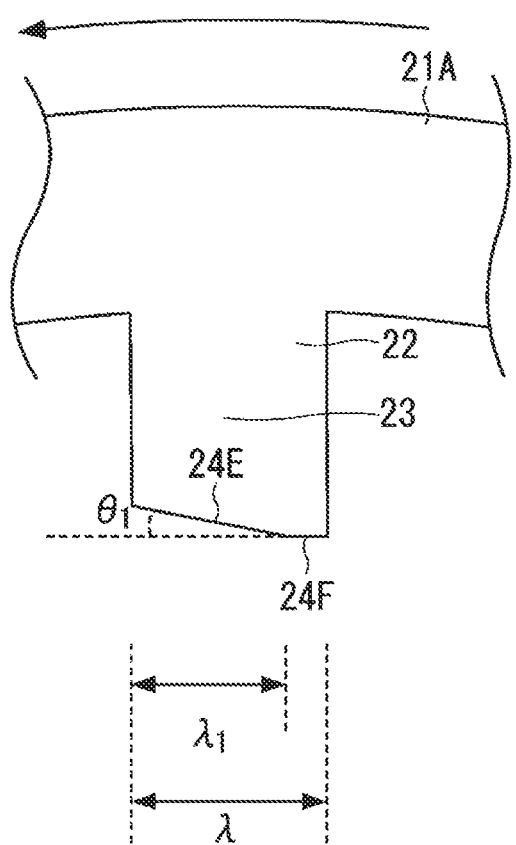
FIG. 8 is a side view of another example of the protruding portion of the rotor.

FIG. 8 is a side view of another example of each protruding portion 22 for rotor pole of the rotor 20. The tip 23 of each protruding portion 22 for rotor pole provided to the first ring member 21A and the second ring member 21B has a tapered surface 24E with the height of the protruding portion decreasing along the rotational direction. The tapered surface 24 is formed by cutting off the projecting surface 24F, which extends perpendicularly for a given length from the side of the reverse rotational direction toward the side of the rotational direction by cut-off angle θ1.

Figure 9:
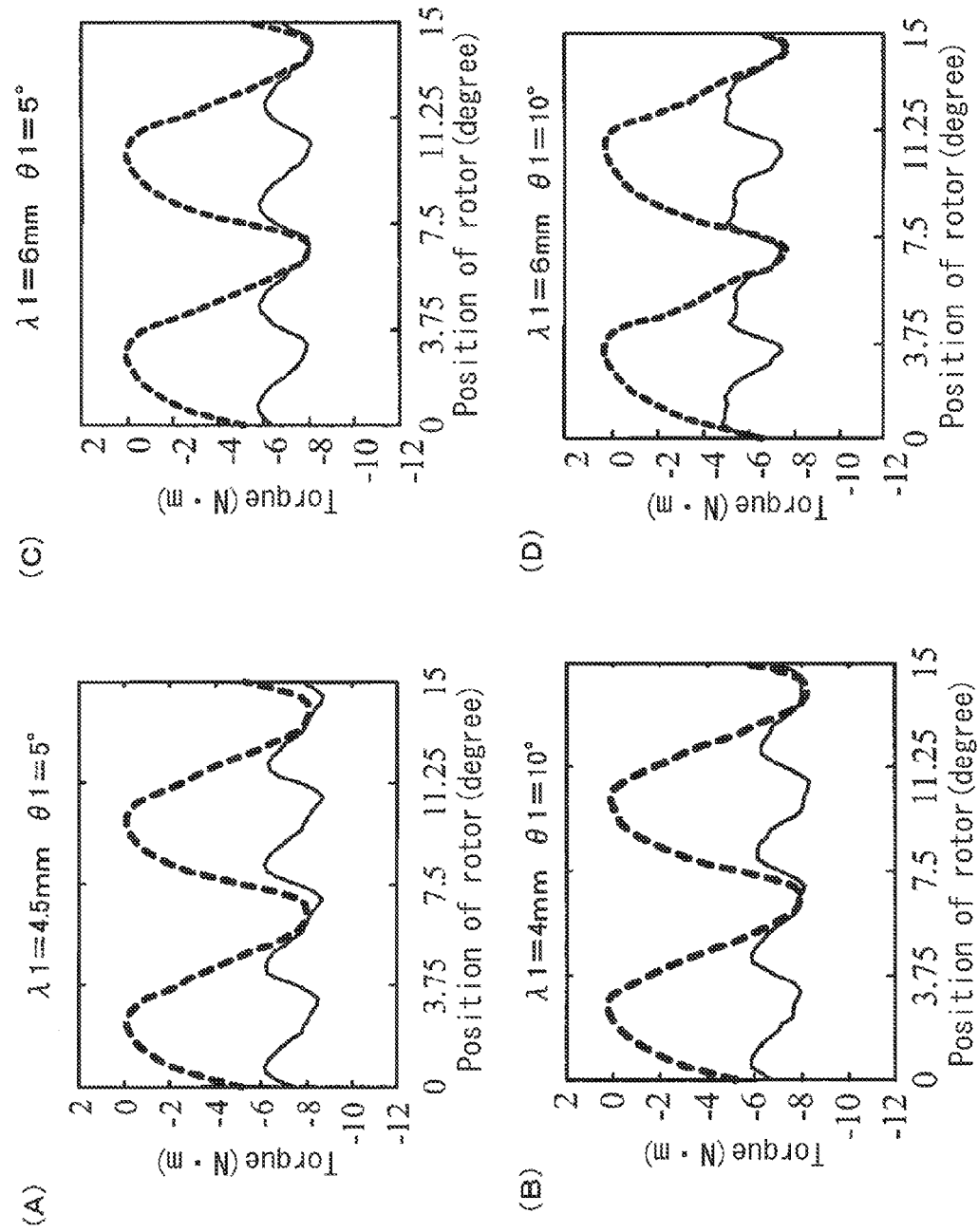
FIG. 9 is a chart showing torque waveforms obtained when each protruding portion of the rotor is in a shape shown in FIG. 8, λ1 and θ1 in (A) being 4.5 mm and 5° respectively, those in (B) being 4 mm and 10°, those in (C) being 6 mm and 5°, and those in (D) being 6 mm and 10°.

FIG. 9 is a chart showing the torque waveforms when each protruding portion of the rotor has a tapered surface 24E and a projecting surface 24F as shown in FIG. 8, in which (A) is the case where λ1 is 4.5 mm and θ1 is 5°, (B) is the case where λ1 is 4 mm and θ1 is 10°, (C) is the case where λ1 is 6 mm and θ1 is 5°, and (D) is the case where λ1 is 6 mm and θ1 is 10°. The dotted line of each chart is the torque waveform obtained from one-stage PMRG, and the solid line is the torque waveform obtained from two-stage PMRG structure. The rotational speed was set at 1000 rpm. The length λ shown in FIG. 8 is 9 mm.

As shown in FIG. 9, even if angle θ1 is increased, the torque waveform around the peak remains smooth, indicating that high-order component has been decreased. With the waveform shown in FIG. 9 (A), torque ripple ratio is 34.7% and the maximum output is 357 W, meaning that better characteristics than the result shown in FIG. 7 were obtained.

From the above, by allowing the tip 23 of each protruding portion 22 for rotor pole to have a tapered surface 24E and the projecting surface 24F, excessive concentration of magnetic flux can be reduced. In addition, by increasing the cut-off angle θ, generated high-order harmonic components can be reduced.

By the way, at the time immediately before the rotor pole comes close to the stator pole, starting to facing opposite to each other, and immediately before the rotor pole is detached from the stator pole completely, the change in magnetic reluctance reaches the maximum, causing ripple in the torque waveform. It is therefore preferable that the tip 23 of each protruding portion 22 for rotor pole of the rotor 20 have a first tapered surface 24A having a flat surface whose cross section is in a linear form, with the height of the protruding portion decreasing along the rotational direction shown by the arrow, and a second tapered surface 24B having a flat surface whose cross section is in a linear form, with the height of the protruding portion decreasing along the direction reverse to the one shown by the arrow. In this case, the distance between each protruding portion 22 for rotor pole of the rotor 20 and the protruding portion 12 for stator pole of the stator 10 is the shortest at the center of the protruding portion 23A of each protruding portion 22 for rotor pole. Consequently, decrease in output of generator 1 can also be suppressed.

The first tapered surface 24A and the second tapered surface 24B may be, or may not be contacted with each other. The curved surface 24C at the center of the protruding portion 23A may be allowed to face the direction of the rotational axis of the rotor 20. In this case, the curved surface 24C may have a shape whose cross-sectional area is in a concaved shape as shown in FIG. 4, or in a convex shape on the contrary to the shape shown in FIG. 4.

Figure 10:
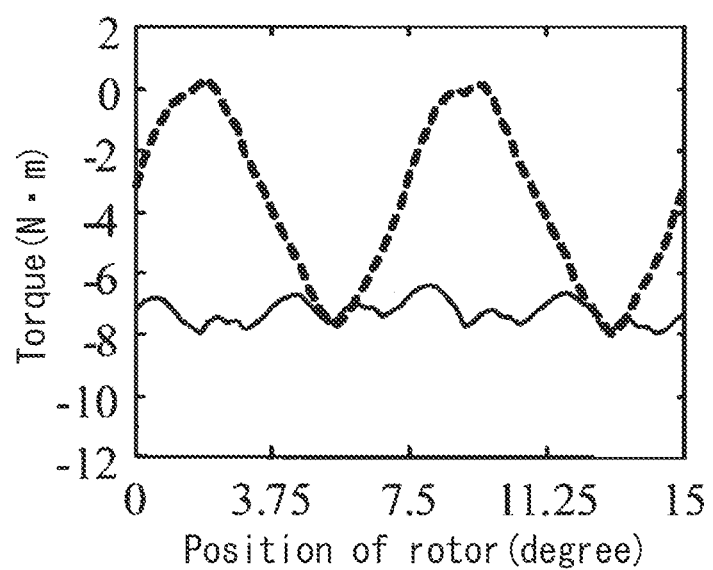
FIG. 10 is a chart showing torque waveforms obtained when the tip of each protruding portion has tapered faces on both sides and a curved face is provided at the center.

FIG. 10 is a chart showing the torque waveforms obtained when the tip 23 of each protruding portion 22 for rotor pole has tapered surfaces 24A, 24B on both sides, with curved surface 24C provided at the center. The dotted line of each chart is the torque waveform obtained from one-stage PMRG, and the solid line is the torque waveform obtained from two-stage PMRG structure. The dimensions of the protruding portion 22 for rotor pole are as follows: Length of λ is 9 mm, length of λ1, λ2 is 2 mm, and cut-off angle θ1, θ2 is 15°. As shown in FIG. 10, the torque waveform of one-stage PMRG is mostly symmetrical both horizontally and vertically, and comprised of fundamental wave and odd-order components only. Consequently, the waveform of two-stage PMRG structure, namely the one obtained by combining the torque waveform of the first-stage PMRG and that of the second-stage PMRG, shows that generation of ripple is being suppressed. With the dimensions of the protruding portion 22 described above, the decrease in power output can be reduced to 14%, whereas the torque ripple can be reduced by 62%.

The generator 1 in the first embodiment of the present invention comprises a stator 10 having a plurality of protruding stator poles 12 on the outer peripheral surface of the cylinder, and a rotor 20 having a plurality of ring members 21A, 21B and a plurality of rotor poles 22 protruding inward from the plurality of the ring members 21A, 21B. To the stator 10, magnets 14A, 14B, 14C, and 14D are provided at positions facing opposite to each other across the shaft, so that pairs are formed. The plurality of stator poles 12 of the stator 10 are formed as a first protrusion group 12A and a second protrusion group 12B spaced apart from each other at a given distance in the axial direction. Meanwhile, the plurality of rotor poles 22 of the rotor 20 are formed as a first protrusion group 22A and a second protrusion group 22B spaced apart from each other in the axial direction. The second protrusion group 22B of the rotor 20 is shifted from the first protrusion group 22A of the rotor 20 by a mechanical angle around the rotational axis allowing their electrical phases to differ by 180°, and each tip 23 of the plurality of rotor poles 12 of the rotor has a tapered surface allowing the height of the protruding portion to be reduced along the rotational, or reverse rotational direction.

The tip 23 of the plurality of rotor poles 22 of the rotor, in particular, has a first tapered surface 24A with the height of the protruding portion decreasing along the rotational direction, and a second tapered surface 22B with the height of the protruding portion decreasing along the reverse rotational direction. More preferably, a projecting surface 24F having an arc-like cross-sectional area be provided between the first tapered surface 24A and the second tapered surface 22B.

Since the generator 1 in the first embodiment of the present invention has the structure described above, low torque ripple can be achieved without decreasing power generation efficiency.

Second Embodiment

As a variation of the first embodiment, a second embodiment will hereafter be described.

Figure 11:
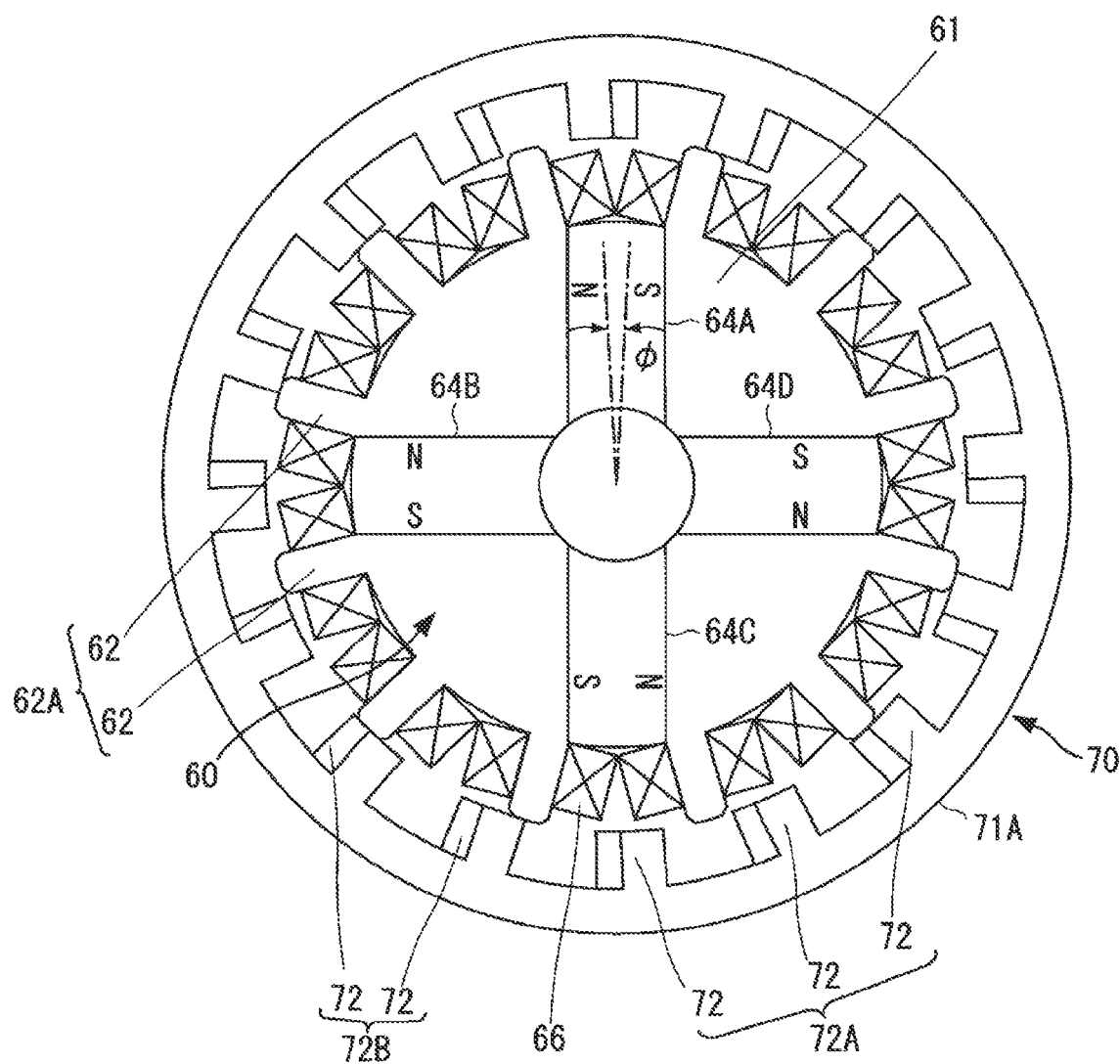
FIG. 11 is a side view of the generator related to the second embodiment.
Figure 12:
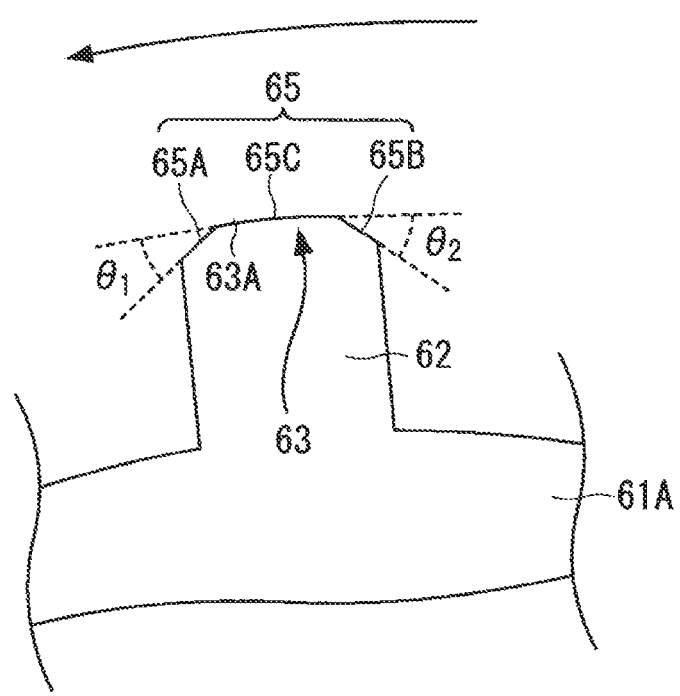
FIG. 12 is an enlarged side view of a protruding portion of the rotor shown in FIG. 11.

FIG. 11 is a side view of a generator related to the second embodiment, equivalent to FIG. 3 illustrating the first embodiment. FIG. 12 is an enlarged side view of a protruding portion 62 provided to the stator 60 shown in FIG. 11.

The generator related to the second embodiment also has a stator 60 and a rotor 70, as in the case of the generator 1 related to the first embodiment. Specifically, the stator 60 has a plurality of protruding stator poles on the outer peripheral surface of the cylinder. The rotor 70 has a first ring member 71A and a second ring member and a plurality of rotor poles protruding inward from the first ring member 71A and the second ring member toward the outer peripheral side of the stator. The stator 60 has a plurality of magnets 64A, 64B, 64C, and 64D, which are placed at positions facing opposite to each other across the shaft, forming pairs. The plurality of stator poles of the stator 60 are provided as a first protrusion group and as a second protrusion group separately in the same phase spaced apart from each other in the axial direction at a given distance. The first protrusion group and the second protrusion group of the stator 60 are to be called the first protrusion group for stator pole, and the second protrusion group for stator pole. Meanwhile, a plurality of rotor poles of the rotor 70 are provided as a first protrusion group and as a second protrusion group separately, spaced apart from each other in the axial direction at a given distance. The first protrusion group and the second protrusion group of the rotor 70 are to be called the first protrusion group for rotor pole and the second protrusion group for rotor pole respectively. The second protrusion group for rotor pole of the rotor 70 is shifted from the first protrusion group for rotor pole by mechanical angle φ around the rotational axis so that the electrical phase difference is maintained at 180°. Windings 66 are attached to the protruding portions 62 of the stator 60. The structure described above is the same as that of the first embodiment.

In the second embodiment, unlike the first embodiment, by elaborating the shape of the tip 63 of the protruding portions 62 of the stator 60 (also called protruding portions for stator pole), torque ripple is reduced. Specifically, the tip 63 of each protruding portion 62 of the stator 60 has a first tapered flat surface 65A whose cross section is in a linear form with the height of the protruding portion decreasing along the rotational direction of the rotor 70 shown by the arrow, a second tapered surface 65B whose cross section is in a linear form with the height of the protruding portion decreasing along the reverse rotational direction of the rotor 70 shown by the arrow, and a curved surface 65C provided between the first tapered surface 65A and the second tapered surface 65B. The curved surface 65C has a given radius of curvature with respect to the shaft of the stator 60. This shape of each protruding portion 62 allows torque ripple to be decreased as in the case of the first embodiment.

The generator related to the second embodiment of the present invention comprises a stator 60 having a plurality of protruding stator poles 62 on the cylindrical outer peripheral surface, and a rotor 70 having a plurality of ring members 71A and a plurality of rotor poles 72 protruding from the plurality of ring members 71A. Magnets 64A, 64B, 64C, 64D are provided to the stator 60, facing opposite to each other across the shaft, and thus forming pairs. The plurality of stator poles 62 of the stator 60 are provided separately as a first protrusion group 62A and a second protrusion group spaced apart at a given distance along the axial direction. Meanwhile, the plurality of rotor poles 72 of the rotor 70 are provided separately as a first protrusion group 72A and a second protrusion group 72B spaced apart at a given distance along the axial direction. The second protrusion group 72B of the rotor 70 is shifted from the first protrusion group 72A of the rotor 70 by a mechanical angle allowing their electrical phases to differ by 180°, and each tip of the plurality of stator poles 62 of the stator 60 has a tapered surface with the height of the protruding portion decreasing along the rotational or reverse rotational direction of the rotor 70.

Each tip 63 of the plurality of stator poles 62 of the stator 60, in particular, has a first tapered surface 65A with the height of the protruding portion decreasing along the rotational direction, and a second tapered surface 65B with the height of the protruding portion decreasing along the reverse rotational direction. More preferably, a protruding surface whose cross-sectional area is in an arc-like shape be provided between the first tapered surface 65A and the second tapered surface 65B.

Other Embodiments

With the first and the second embodiments, the first protrusion group 12A, 62A of the stator 10, 60 (also called the first protrusion group for stator pole) and the second protrusion group 12B (also called the second protrusion group for stator pole) are placed in the same phase, and the second protrusion group 22B, 72B of the rotor 20, 70 (also called the second protrusion group for rotor pole) is shifted from the first protrusion group 22A, 72A of the rotor 20, 70 (also called the first protrusion group for rotor pole) by a mechanical angle around the axis allowing the electrical phase difference to be maintained at 180°. However, the present invention is not limited to this configuration. The first protrusion group for rotor pole and the second protrusion group for rotor pole may be placed in the same phase, and the second protrusion group for stator pole may be shifted from the first protrusion group for stator pole by a mechanical angle around the axis allowing the electrical phase difference to be maintained at 180°.

EXAMPLE

The present invention will hereafter be described further in detail by referring to an example.

A trial model of generator 1 in the first embodiment shown in FIGS. 1 to 4 was made. The made generator 1 has 12 stator poles and 16 rotor poles in each stage. The stator 10 measured 135.6 mm in diameter of a virtual circle connecting the tips of the protruding portions 12, the internal diameter of the stator main unit of the stator 10 was 30 mm, and the outside diameter of the stator main unit 11 was 104 mm. The rotor 20 measured 180 mm in the outside diameter of the first and the second ring members 21A, 21B, 160 mm in internal diameter, and the gap between the tip of the protruding portion 22 and the protruding portion 12 was set at 0.2 mm. The width λ of each protruding portion 22 of the rotor 20 was 9 mm, and the first and the second tapered surface 24A, 24B were formed with the distance from outside λ1, λ2 maintained at 2 mm, and with cut-off angle θ1, θ2 maintained at 15°. As magnets 14A to 14D, ferrite magnets were used.

Figure 13:
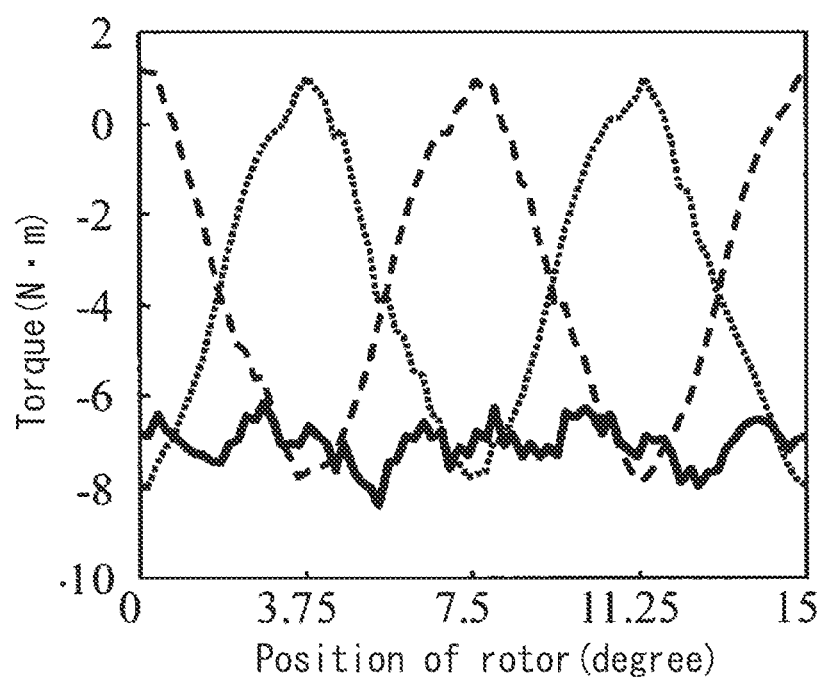
FIG. 13 is a chart showing torque waveforms at the maximum output corresponding to the rotational speed of 1000 rpm in an example of the present invention.

FIG. 13 is a chart showing the torque waveforms obtained at the maximum output when the rotational speed was set at 1000 rpm. The horizontal axis represents the position of the rotor in degrees, and the vertical axis represents torque. The dotted line and the dashed line, of the waveforms shown, represent the torque generated at PMRG in each stage found by measuring the winding current and conducting analysis using a finite element model. As shown by each dotted line in FIG. 13, the phases of the waveforms of the torque generated at PMRG in each stage are deviated from each other by half cycle. In addition, these torque waveforms are mostly symmetrical both horizontally and vertically. Consequently, the composite waveform obtained by combining these waveforms exhibit little torque ripple as shown by the solid line.

Figure 14:
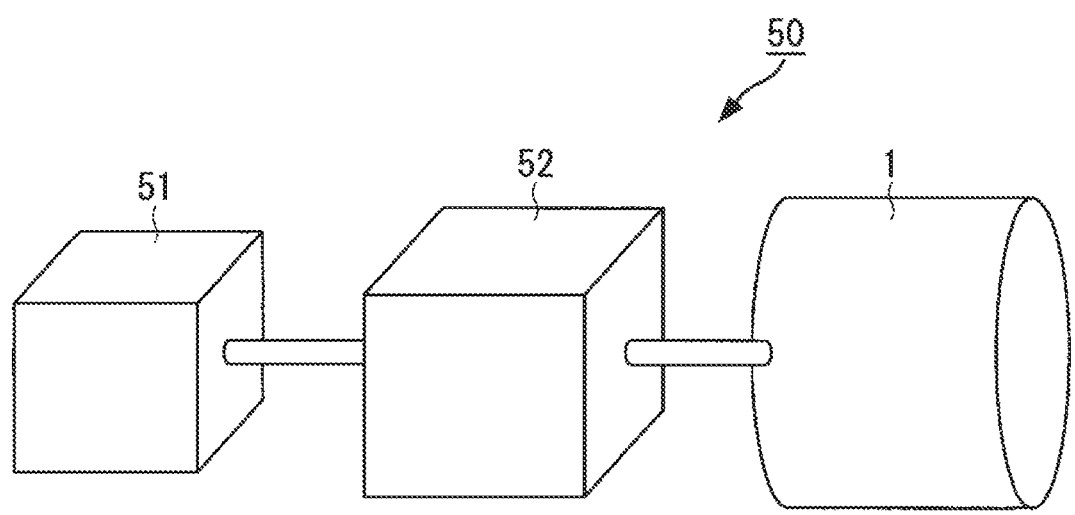
FIG. 14 illustrates a demonstration experimental system of the generator in the example.

FIG. 14 illustrates a demonstration experimental system 50 of the generator 1. As shown in FIG. 14, the generator 1 was driven at an arbitrary rotational speed using a PM motor 51. A torque meter 52 was inserted between the PM motor 51 and the generator 1 to measure the input torque and the rotational speed.

FIG. 15 is a chart showing the waveforms of voltage induced to the winding in a state where the winding is released, namely the state under no load, in which (A) presents the waveforms found by calculation, and (B) presents those obtained by measurement. The rotational speed was set at 1000 rpm. Waveforms u1, v1, and w1 are those of the first-stage PMRG, whereas u2, v2, and w2 are those of the second-stage PMRG. FIG. 15 indicates that the calculated waveforms mostly coincide with the measured waveforms. In addition, since the phase difference between each waveform is equal, it is apparent that the electrical phase difference between the first-stage PMRG and the second-stage PMRG is reproduced accurately.

Figure 16:
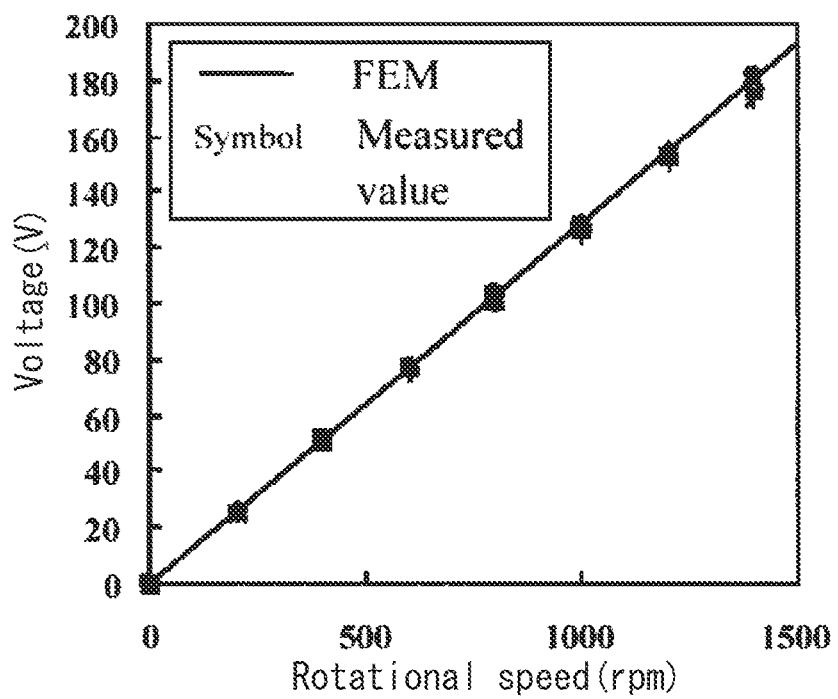
FIG. 16 is a chart showing the effective value of the voltage induced under no load at each rotational speed in the example.

FIG. 16 is a chart representing the effective value of induced voltage under no load at each rotational speed. The solid line represents the analysis result obtained by the finite element method, and the symbols represent measurement values. The calculation/analysis result and the measurement result coincide with each other well.

Figure 17:
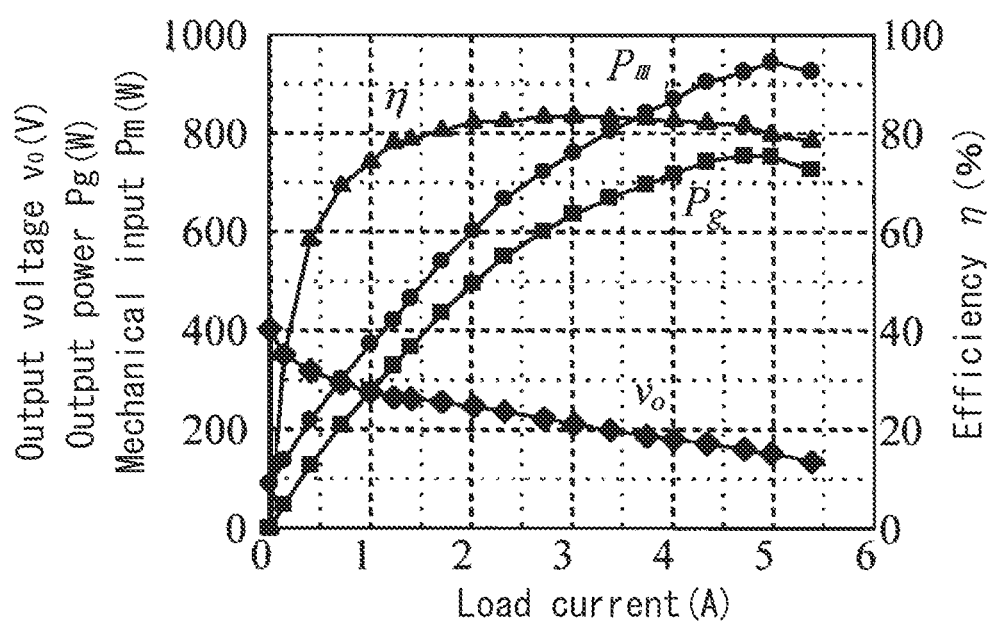
FIG. 17 is a chart illustrating the power generation characteristics of a trial model of the generator.

FIG. 17 is a chart illustrating the power generation characteristics of the trial generator. With the increase of load current, the output voltage $V_0$ tended to decrease smoothly, whereas the mechanical input $P_m$ increased and exhibited saturation tendency when the load current reached 4 A and higher, and the output power $P_g$ exhibited the similar tendency as the mechanical input $P_m$. The efficiency η kept increasing until 1.5 A was reached and then remained mostly constant. The maximum output power was 754 W, and the efficiency η was 81.7%.

Figure 18:
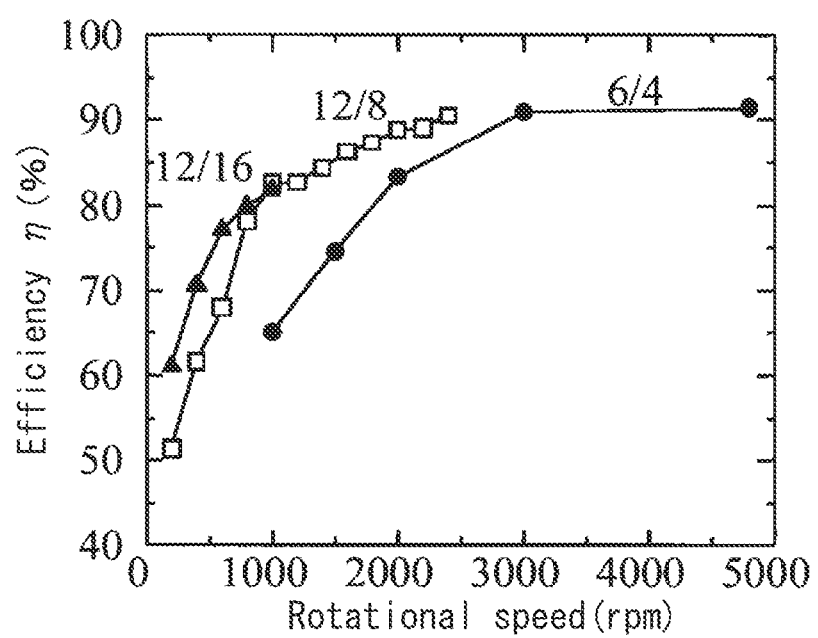
FIG. 18 is a chart illustrating the efficiency measurement obtained at the maximum output corresponding to each rotational speed.

FIG. 18 is a chart illustrating the measurement of efficiency at the maximum output corresponding to each rotational speed. In addition to a 12/16 PMRG having 12 stators and 16 rotors, measurement was also conducted with 12/8 PMRG having 12 stators and 8 rotors, and with 6/4 PMRG having 6 stators and 4 rotors. As shown in FIG. 18, with the increase in the rotational speed, the efficiency η of every generator 1 increased. When the generator 1 was 12/16 PMRG, namely by increasing the number of rotor poles and stator poles, the efficiency η increased even at low speed.

Simulations by the finite element method will hereafter be described regarding the case where neodymium magnets and ferrite magnets are adopted respectively. The shape of the stator 10 and the rotor 20 were as shown in FIG. 2. Note, however, that the size of the hollow along the shaft differs between neodymium magnets and ferrite magnets, the size of the former being larger than that of the latter. The reason for this is as follows: Neodymium magnets have flux content 3 to 4 times larger than that of the ferrite magnets, and if neodymium magnets of the same volume as that of ferrite magnets are mounted, magnetic saturation occurs to the stator poles and rotor poles, thus decreasing generation output and efficiency. By changing the dimension of the hollow, comparison was made, adopting the magnet dimensions ensuring the highest power output.

Figure 19:
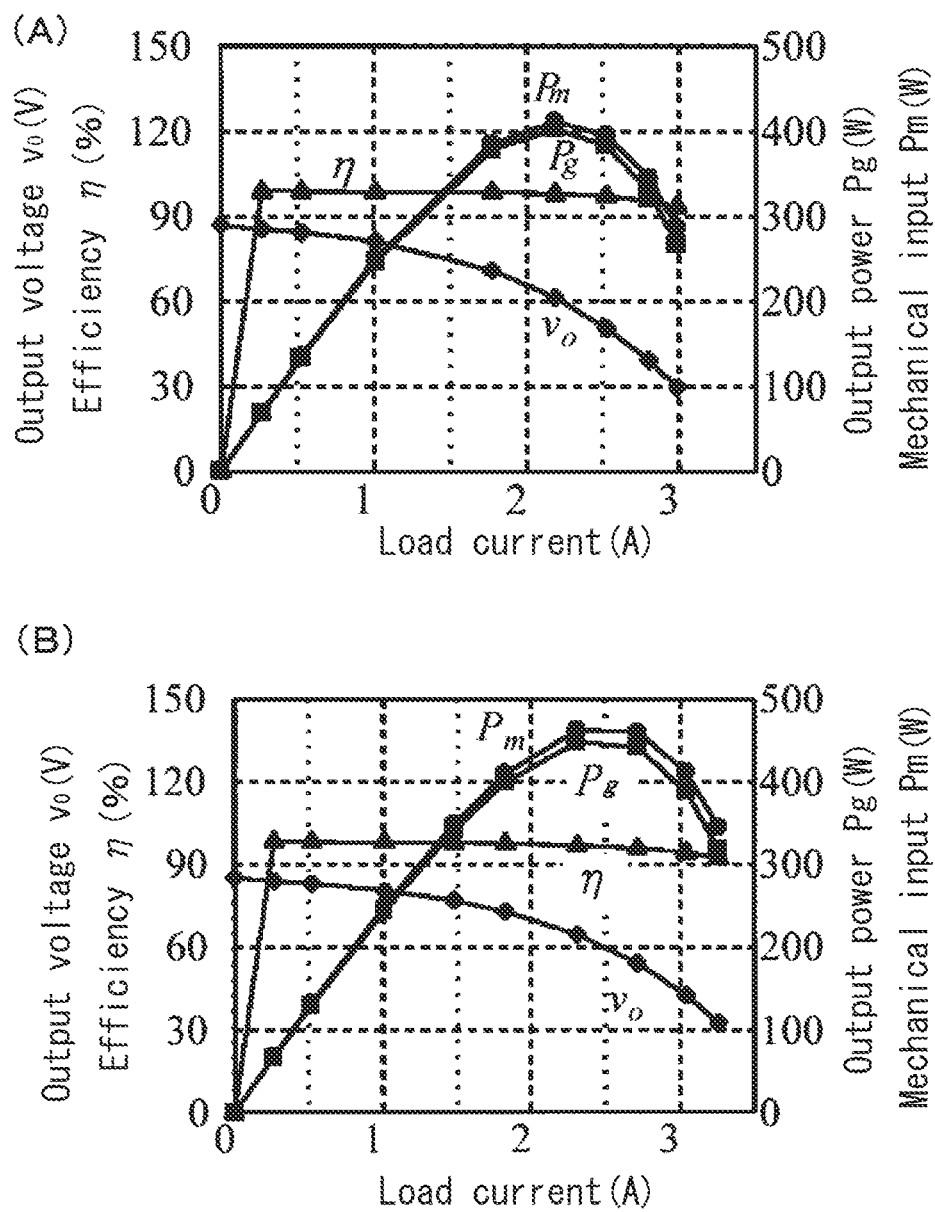
FIG. 19 is a chart illustrating the results of simulation, in which (A) is the case where ferrite magnets are used, and (B) is the case where neodymium magnets are used as rare-earth magnets.

FIG. 19 is a chart illustrating the simulation result, in which (A) is the result of the case where ferrite magnets were used, and (B) is the result of the case where neodymium magnets were used as rare-earth magnets. The horizontal axis of each chart represents load current, vertical axis at left represents output voltage $V_0$ and efficiency η, and the vertical axis at right represents output voltage $P_g$ and mechanical input $P_m$.

In both cases where ferrite magnets or neodymium magnets are used as magnets 14A to 14D, with the increase in load current, the output voltage $V_0$ tended to decrease smoothly, the mechanical input $P_m$ increased and exhibited light decreasing tendency when the load current exceeded approximately 2 A, and the output power $P_g$ exhibited the similar tendency as the mechanical input $P_m$. The efficiency kept increasing sharply until approximately 0.25 A was reached and then remained mostly constant.

Even when ferrite magnets were used as magnets 14A to 14D, the same tendency was observed as in the case where neodymium magnets were used, which confirmed that power generation characteristics, conversion efficiency in particular, do not decrease even if low-cost ferrite magnets are used.

In each embodiment of the present invention, the outer rotor configuration, in which the rotor 20 was provided outside, ferrite magnets were integrated into the stator 10 as yokes, and the pair of stator poles and rotor poles was provided in two stages, was adopted to cancel the fundamental waves and odd-order harmonic components of torque ripple. In addition, since the tip 12 of the rotor pole was made to be in a tapered shape, harmonic components of torque ripple can be suppressed. Consequently, the embodiment of the present invention can reduce torque ripple, and achieves low-cost yet high-efficiency power generation.

The embodiments of the present invention are not limited to those described above, but can be changed as required without departing from the scope of the invention. In each of the embodiments described above, either the protruding portion 12 as the stator pole or the protruding portion 22 as the rotor pole has the first tapered surface with the height of the protruding portion decreasing along the rotational direction, and the second tapered surface with the height of the protruding portion decreasing along the reverse rotational direction. However, a tapered surface with the height of the protruding portion decreasing along the rotational direction only, or tapered surface with the height of the protruding portion decreasing along the reverse rotational direction only, may also be allowed, for example.

What is claimed is:

1. A generator, comprising:
a stator having a plurality of protruding portions for stator pole arranged on the outer peripheral surface of a stator main unit; and
a rotor having a plurality of protruding portions for rotor pole placed around the stator in a rotatable state,
wherein, the height of each protruding portion of either the plurality of protruding portions for stator pole or the plurality of protruding portions for rotor pole is made to be lower toward its sides by being cut in the rotational or reverse rotational direction of the rotor;
the plurality of protruding portions for stator pole are separated into a first protrusion group for stator pole and a second protrusion group for stator pole spaced apart from each other at a given distance in the axial direction, both the first protrusion group for stator pole and the second protrusion group for stator pole being structured with the protruding portions for stator pole aligned in a circumferential direction spaced apart from each other;
the rotor has a first ring member and a second ring member separated from each other at a given distance in the axial direction, and a first protrusion group for rotor pole and a second protrusion group for rotor pole aligned spaced apart from each other on each of the internal peripheral surface of the first ring member and the second ring member; and
the first protrusion group for stator pole and the second protrusion group for stator pole are placed in the same phase; and the second protrusion group for rotor pole is deviated from the first protrusion group for rotor pole by a mechanical angle around the axis allowing their electrical phases to be deviated by half cycle to superimpose half-cycle-deviated torque waveforms of the same shape, thus canceling the fundamental waveforms and odd-order harmonic components of the torque waveforms.

2. A generator, comprising:
a stator having a plurality of protruding portions for stator pole arranged on the outer peripheral surface of a stator main unit; and
a rotor having a plurality of protruding portions for rotor pole placed around the stator in a rotatable state,
wherein, the height of each protruding portion of either the plurality of protruding portions for stator pole or the plurality of protruding portions for rotor pole is made to be lower toward its sides by being cut in the rotational or reverse rotational direction of the rotor;
the plurality of protruding portions for stator pole are separated into a first protrusion group for stator pole and a second protrusion group for stator pole spaced apart from each other at a given distance in the axial direction, both the first protrusion group for stator pole and the second protrusion group for stator pole being structured with the protruding portions for stator pole aligned in a circumferential direction spaced apart from each other;
the rotor has a first ring member and a second ring member separated from each other at a given distance in the axial direction, and a first protrusion group for rotor pole and a second protrusion group for rotor pole aligned spaced apart from each other on each of the internal peripheral surface of the first ring member and the second ring member; and
the first protrusion group for rotor pole and the second protrusion group for rotor pole are placed in the same phase; and the second protrusion group for stator pole is deviated from the first protrusion group for stator pole by a mechanical angle around the axis allowing their electrical phases to be deviated by half cycle to superimpose half-cycle-deviated torque waveforms of the same shape, thus canceling the fundamental waveforms and odd-order harmonic components of the torque waveforms.

3. The generator as set forth in claim 1 or 2, wherein the plurality of protruding portions for rotor pole have a first tapered surface with the height of the protruding portions decreasing along the rotational direction of the rotor, and a second tapered surface with the height of the protruding portions decreasing along the reverse rotational direction of the rotor.

4. The generator as set forth in claim 3, wherein each tip of the plurality of protruding portions for rotor pole has a projecting surface whose cross section is in an arc-like shape between the first tapered surfaced and the second tapered surface.

5. The generator as set forth in claim 1 or 2, wherein the plurality of protruding portions for stator pole have a first tapered surface with the height of the protruding portions decreasing along the rotational direction of the rotor, and a second tapered surface with the height of the protruding portions decreasing along the reverse rotational direction of the rotor.

6. The generator as set forth in claim 5, wherein each tip of the plurality of protruding portions for stator pole has a projecting surface whose cross section is in an arc-like shape between the first tapered surface and the second tapered surface.

7. The generator as set forth in claim 1 or 2, wherein magnets are provided to the rotor at positions facing opposite to each other across the shaft, forming pairs.

8. The generator as set forth in claim 7, wherein the magnets are placed in a shape of a cross centered on the shaft of the stator.

9. The generator as set forth in claim 7, wherein the magnets are ferrite magnets.

10. The generator as set forth in claim 1, wherein the stator is configured with N ($\geq$2) pieces of magnets mounted to the stator main unit at equal intervals around the central axis of the stator main unit; and the N pieces of magnets are arranged so that each of the magnets extends from the central axis of the stator main unit toward the rotor, and in order for the surfaces forming 360/N degrees on a plane parallel to the direction of the central axis of the stator main unit to have the same polarity.

11. The generator as set forth in claim 1, wherein the stator is configured with a first magnet, a second magnet, a third magnet, and a forth magnet mounted to the stator main unit at equal intervals around the central axis of the stator main unit: and the first magnet, the second magnet, the third magnet, and the fourth magnet are arranged so that each of the magnets extends from the central axis of the stator main unit toward the rotor, and in order for the surfaces forming 90° on a plane parallel to the direction of the central axis of the stator main unit to have the same polarity.

12. The generator as set forth in claim 2, wherein the stator is configured with N (≥2) pieces of magnets mounted to the stator main unit at equal intervals around the central axis of the stator main unit; and the N pieces of magnets are arranged so that each of the magnets extends from the central axis of the stator main unit toward the rotor, and in order for the surfaces forming 360/N degrees on a plane parallel to the direction of the central axis of the stator main unit to have the same polarity.

13. The generator as set forth in claim 2, wherein the stator is configured with a first magnet, a second magnet, a third magnet, and a forth magnet mounted to the stator main unit at equal intervals around the central axis of the stator main unit: and the first magnet, the second magnet, the third magnet, and the fourth magnet are arranged so that each of the magnets extends from the central axis of the stator main unit toward the rotor, and in order for the surfaces forming 90° on a plane parallel to the direction of the central axis of the stator main unit to have the same polarity.

14. The generator as set forth in claim 1 or 2, wherein the mechanical angle is defined by $180°*|1/x-1/y|$, wherein x is the number of each stator pole in the first protrusion group and the second protrusion group, y is the number y of each rotor pole in the first protrusion group and the second protrusion group.

\* \* \* \* \*